US012562880B2

(12) United States Patent
Lim et al.

(10) Patent No.: US 12,562,880 B2
(45) Date of Patent: Feb. 24, 2026

(54) METHOD AND APPARATUS FOR FINDING LOST DEVICE USING UWB AND AR APPARATUS

(71) Applicant: SAMSUNG ELECTRONICS CO., LTD., Suwon-si (KR)

(72) Inventors: Chaigil Lim, Suwon-si (KR); Geunsok Kim, Suwon-si (KR); Jaehwa Shin, Suwon-si (KR); Jiman Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 591 days.

(21) Appl. No.: 17/895,628

(22) Filed: Aug. 25, 2022

(65) Prior Publication Data

US 2022/0407666 A1     Dec. 22, 2022

Related U.S. Application Data

(63) Continuation of application No. PCT/KR2021/010249, filed on Aug. 4, 2021.

(30) Foreign Application Priority Data

Aug. 4, 2020     (KR) ........................ 10-2020-0097683
Jan. 12, 2021     (KR) ........................ 10-2021-0004178

(51) Int. Cl.
*H04W 4/00*          (2018.01)
*H04L 5/00*          (2006.01)
          (Continued)

(52) U.S. Cl.
CPC .......... *H04L 5/0098* (2013.01); *H04L 5/0048* (2013.01); *H04W 72/0453* (2013.01); *H04W 76/15* (2018.02)

(58) Field of Classification Search
CPC .............. H04W 76/15; H04W 72/0453; H04L 5/0098; H04L 5/0048
          (Continued)

(56) References Cited

U.S. PATENT DOCUMENTS 9,571,985 B2 *  2/2017  Bottazzi ................ H04W 4/023
9,848,299 B1   12/2017  Kumar et al.
          (Continued)

FOREIGN PATENT DOCUMENTS

CN          110536246 A          12/2019
CN          110972070 A          4/2020
          (Continued)

OTHER PUBLICATIONS

European Office Action issued May 31, 2024 in corresponding European Patent Application No. 21852515.2.
          (Continued)

*Primary Examiner* — Marceau Milord
(74) *Attorney, Agent, or Firm* — Nixon & Vanderhye P.C.

(57)          ABSTRACT

An electronic device according to an embodiment includes: a camera; a display; a location measuring circuit; an ultra-wide band (UWB) antenna; a UWB communication circuit; a first wireless communication circuit configured to support near field communication; a second wireless communication circuit configured to support cellular communication; and at least one processor, wherein the at least one processor is configured to: acquire information about an external device from a server using the second wireless communication circuit; establish a near field communication connection with the external device through the first wireless communication circuit based on the electronic device being within a specified distance from the external device; transmit a request for activating a UWB function of the external device to the external device; identify the location of the external
          (Continued)

device with respect to the electronic device based on a UWB signal received from the external device; and output an augmented reality (AR) interface to the display based on image data acquired using the camera and the identified location of the external device.

15 Claims, 21 Drawing Sheets

(51) Int. Cl.
*H04W 72/0453* (2023.01)
*H04W 76/15* (2018.01)

(58) Field of Classification Search
USPC .......................................................... 370/329
See application file for complete search history.

(56) References Cited

U.S. PATENT DOCUMENTS

| | | | |
|---|---|---|---|
| 10,609,513 B2 | 3/2020 | De Barros Chapiewski et al. | |
| 10,609,514 B2 | 3/2020 | Evans et al. | |
| 10,645,526 B2 | 5/2020 | Lévêque et al. | |
| 11,606,669 B2 | 3/2023 | Lopatin et al. | |
| 11,622,243 B2 * | 4/2023 | Burowski | H04W 12/50 455/41.2 |
| 11,641,563 B2 * | 5/2023 | Lopatin | H04W 12/126 380/274 |
| 11,700,168 B2 * | 7/2023 | Pai | G06Q 10/1097 709/203 |
| 11,768,578 B2 * | 9/2023 | Behzadi | G06F 3/0482 715/848 |
| 11,770,672 B2 * | 9/2023 | de la Broise | H04L 67/303 370/546 |
| 11,778,375 B2 * | 10/2023 | Walley | H04M 1/0202 381/55 |
| 11,921,857 B2 * | 3/2024 | Lee | G06F 21/78 |
| 11,979,502 B2 * | 5/2024 | Martins | H04L 9/0819 |
| 12,101,687 B2 * | 9/2024 | Pai | G01S 5/0072 |
| 2012/0171998 A1 * | 7/2012 | Kang | G06F 21/88 455/411 |
| 2012/0190386 A1 * | 7/2012 | Anderson | G01S 19/14 455/456.3 |
| 2012/0202428 A1 * | 8/2012 | Mirbaha | H04L 12/189 455/41.2 |
| 2013/0035090 A1 * | 2/2013 | Moshfeghi | H04W 52/46 455/11.1 |
| 2014/0279596 A1 * | 9/2014 | Waris | G06Q 10/0833 705/317 |
| 2016/0302044 A1 * | 10/2016 | Bottazzi | H04W 4/30 |
| 2017/0134902 A1 | 5/2017 | Bottazzi et al. | |
| 2018/0227709 A1 | 8/2018 | Evans et al. | |
| 2019/0253829 A1 | 8/2019 | Lévêque et al. | |
| 2020/0082370 A1 * | 3/2020 | Yang | G06Q 20/20 |
| 2020/0103521 A1 | 4/2020 | Chiarella et al. | |
| 2020/0106877 A1 | 4/2020 | Ledvina et al. | |
| 2020/0107164 A1 * | 4/2020 | Lopatin | G01S 5/0284 |
| 2020/0289922 A1 * | 9/2020 | McCoy | A63F 13/65 |
| 2020/0336365 A1 * | 10/2020 | Pai | H04W 12/50 |
| 2021/0064877 A1 * | 3/2021 | Ramasamy | G08G 1/144 |
| 2021/0182111 A1 * | 6/2021 | Jakobsson | G06F 9/5055 |
| 2021/0400441 A1 * | 12/2021 | Burowski | G01S 3/50 |
| 2022/0030338 A1 * | 1/2022 | Innes | H04B 10/25 |
| 2022/0035510 A1 * | 2/2022 | Behzadi | H04W 4/80 |
| 2022/0035921 A1 * | 2/2022 | Lee | G06F 21/71 |
| 2022/0150702 A1 * | 5/2022 | Klinkner | H04W 4/029 |
| 2022/0312112 A1 * | 9/2022 | Walley | H04R 3/04 |
| 2023/0188980 A1 * | 6/2023 | Lee | H04W 12/03 726/2 |
| 2023/0209306 A1 * | 6/2023 | Pai | H04W 64/006 455/456.2 |
| 2025/0247677 A1 | 7/2025 | Lopatin et al. | |

FOREIGN PATENT DOCUMENTS

| | | |
|---|---|---|
| KR | 10-2007-0075975 | 7/2007 |
| KR | 10-2013-0076221 | 7/2013 |
| KR | 10-1343635 | 12/2013 |
| KR | 10-1381291 | 4/2014 |
| KR | 10-1549027 B1 | 9/2015 |
| KR | 10-2016-0112233 | 9/2016 |
| KR | 10-2017-0050119 | 5/2017 |
| KR | 10-1805910 | 12/2017 |
| KR | 10-1825653 | 2/2018 |
| KR | 10-2035388 | 10/2019 |
| KR | 10-2020-0028827 | 3/2020 |
| KR | 10-2020-0068300 A | 6/2020 |
| KR | 10-2021-0033514 A | 3/2021 |
| KR | 10-2021-0151192 A | 12/2021 |

OTHER PUBLICATIONS

"Calculate 3D point coordinates using horizontal and vertical angles and slope distance", https://stackoverflow.com/questions/30619901/calculate-3d-pooint-coordinates-using-horizontal-and-vertical-angles-and-slope-di, Jun. 2015, 2 pages.
International Search Report for PCT/KR2021/010249, mailed Nov. 25, 2021, 4 pages.
Written Opinion of the ISA for PCT/KR2021/010249, mailed Nov. 25, 2021, 5 pages.
Extended European Search Report and Written Opinion dated May 2, 2023 issued by the European Patent Office for European Patent Application No. 21852515.2.
European Office Action dated Jul. 16, 2025 for EP Application No. 21852515.2.
Chinese Office Action dated Aug. 30, 2025 for CN Application No. 202180056720.8.
Korean Notice of Patent Grant dated Sep. 1, 2025 for KR Application No. 10-2021-0004178.

* cited by examiner

METHOD AND APPARATUS FOR FINDING LOST DEVICE USING UWB AND AR APPARATUS

CROSS-REFERENCE TO RELATED APPLICATIONS

This application is a continuation of International Application No. PCT/KR2021/010249 designating the United States, filed on Aug. 4, 2021, in the Korean Intellectual Property Receiving Office and claiming priority to Korean Patent Application No. 10-2020-0097683, filed on Aug. 4, 2020, in the Korean Intellectual Property Office and Korean Patent Application No. 10-2021-0004178, filed on Jan. 12, 2021, in the Korean Intellectual Property Office, the disclosures of which are incorporated by reference herein in their entireties.

BACKGROUND

Field

The disclosure relates to a technology for providing a service of confirming the location of an electronic device.

Description of Related Art

With the recent increase in the spread of various electronic products, users are using, in addition to a mobile communication device such as a smart phone, a number of devices such as smart watches, earphones, or tablets that can be used in connection with the smart phone. However, users may lose some devices due to the small size of the devices such as earphones or due to the user's negligence, and in preparation for such a case, the manufacturer or service provider of the device may provide a service for confirming the location of the lost device.

An existing service may be, for example, a method in which a server collects the location of a lost user's smart phone and provides the location of the smart phone to the user. For example, if a user who has lost a smartphone requests to confirm the location of the smartphone after logging into the website of the smartphone manufacturer with their account, the server may provide location information confirmed through communication with the smartphone through a website or an application.

Since the above method assumes that an electronic device that can communicate directly with the server, such as a smartphone, is lost, it is possible to pair with the smartphone through near field communication (e.g., Bluetooth or Wi-Fi direct) in the above method, but the above method cannot be used with devices (e.g., earphones or headsets) that do not have the ability to communicate directly with the server. In this case, when the lost device transmits its identification information to the peripheral device, the peripheral device may provide its own information and the identification information of the lost device together to the server, and the server may provide location information of the lost device to the original user of the lost device using the identification information of the lost device.

Even if the owner of the lost device acquires the location information of the lost device, the acquired location information corresponds to coordinate information based on a positioning system such as GPS, so that it may be difficult for the user to easily find the lost device even if the user actually visits the corresponding coordinates. For example, even if the acquired coordinates of the lost device specify a certain park or building, realistically, the specified place may correspond to a huge search range from the user's point of view.

SUMMARY

Embodiments of the disclosure provide a method which enables a user to, when the user is in proximity to a lost device, easily discover the lost device, using, for example, ultra-wide band (UWB) communication and augmented reality (AR) functions.

An electronic device according to an example embodiment may include: a camera; a display; a position measuring circuit; an ultra-wide band (UWB) antenna; a UWB communication circuit connected to the UWB antenna; a first wireless communication circuit configured to support near field communication; a second wireless communication circuit configured to support cellular communication; and at least one processor. The at least one processor may be configured to: acquire, from a server, information about an external device registered in the electronic device and not currently connected to the electronic device using the second wireless communication circuit; determine whether the electronic device is within a specified distance of coordinates of the external device included in the information about the external device based on the information acquired from the server and a location of the electronic device measured by the location measuring circuit; establish a near field communication connection with the external device through the first wireless communication circuit in response to the determination; transmit a request for activating a UWB function of the external device to the external device through the established near field communication connection; identify the location of the external device with respect to the electronic device based on a UWB signal received from the external device; and output an AR interface to the display based on image data acquired using the camera and the identified location of the external device.

A method according to an example embodiment may include: acquiring, from a server, information about an external device registered in an electronic device and not currently connected to the electronic device using a second wireless communication circuit of the electronic device; determining whether the electronic device is within a specified distance of coordinates of the external device included in the information about the external device based on the information acquired from the server and a location of the electronic device measured by a location measuring circuit of the electronic device; establishing a near field communication connection with the external device through a first wireless communication circuit of the electronic device in response to the determination; transmitting a request for activating a UWB function of the external device to the external device through the established near field communication connection; identifying the location of the external device with respect to the electronic device based on a UWB signal received from the external device; and outputting an AR interface to a display of the electronic device based on image data acquired using a camera of the electronic device and the identified location of the external device.

An electronic device according to an example embodiment may include: a wireless communication circuit; an ultra-wide band (UWB) communication circuit; a UWB antenna electrically connected to the UWB communication circuit; and a processor electrically or operatively connected to the wireless communication circuit and the UWB communication circuit, wherein the processor is configured to:

establish a near field communication connection with an external device using the wireless communication circuit; receive a UWB activation request via the near field communication connection; and transmit a UWB signal of a designated frequency using the UWB communication circuit in response to the UWB activation request.

An electronic device according to an example embodiment may include: a location measuring circuit; a first wireless communication circuit configured to support near field communication; a second wireless communication circuit configured to support cellular communication; and at least one processor electrically connected to the location measuring circuit, the first wireless communication circuit, and the second wireless communication circuit. The at least one processor may be configured to: acquire an advertising packet from the external device using the first wireless communication circuit; transmit, to a server, identification information of the external device acquired through the advertising packet and location information of the electronic device acquired through the location measuring circuit using the second wireless communication circuit; acquire an authentication key associated with the external device from the server; and establish a communication connection with the external device using the authentication key.

According to various example embodiments, an electronic device may provide appropriate guidance according to a distance from a lost device, and a user may intuitively determine the location of the lost device by following the guidance using augmented reality (AR).

According to various example embodiments, an electronic device may increase search efficiency for a lost device by registering a lost message in advance and restrictively allowing a connection between the lost device and another person's device.

In addition, various effects directly or indirectly identified through this disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with the description of the drawings, the same or similar reference numerals may be used for the same or similar components.

DETAILED DESCRIPTION

Hereinafter, various example embodiments of the disclosure will be described with reference to the accompanying drawings. However, this is not intended to limit the disclosure to specific embodiments, and should be understood to include various modifications, equivalents, and/or alternatives of the embodiments of the disclosure.

Figure 1:
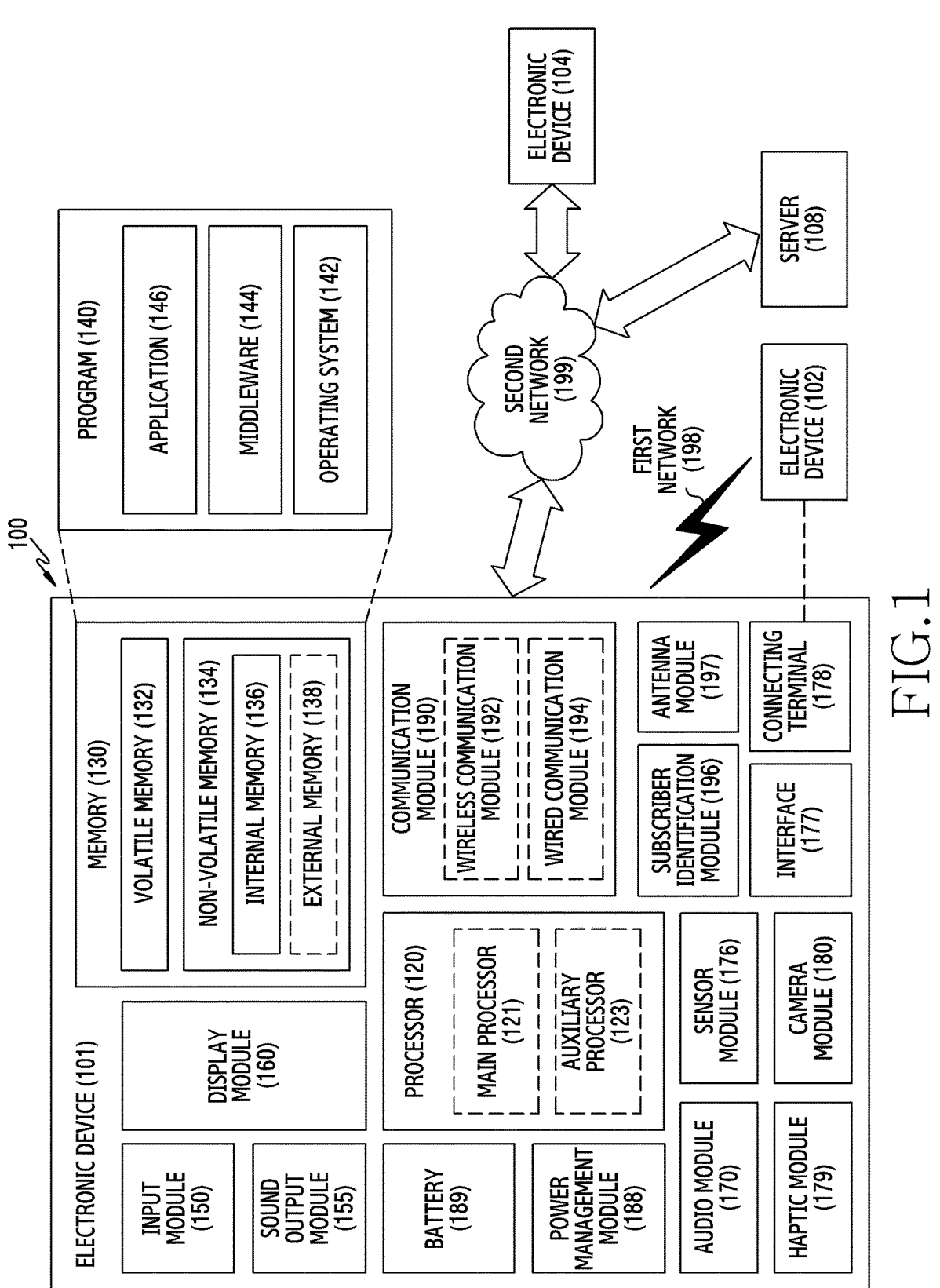
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semisupervised learning, or reinforcement learning. The artificial intelligence model may include a plurality of artificial neural network layers. The artificial neural network may include, for example, and without limitation, a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
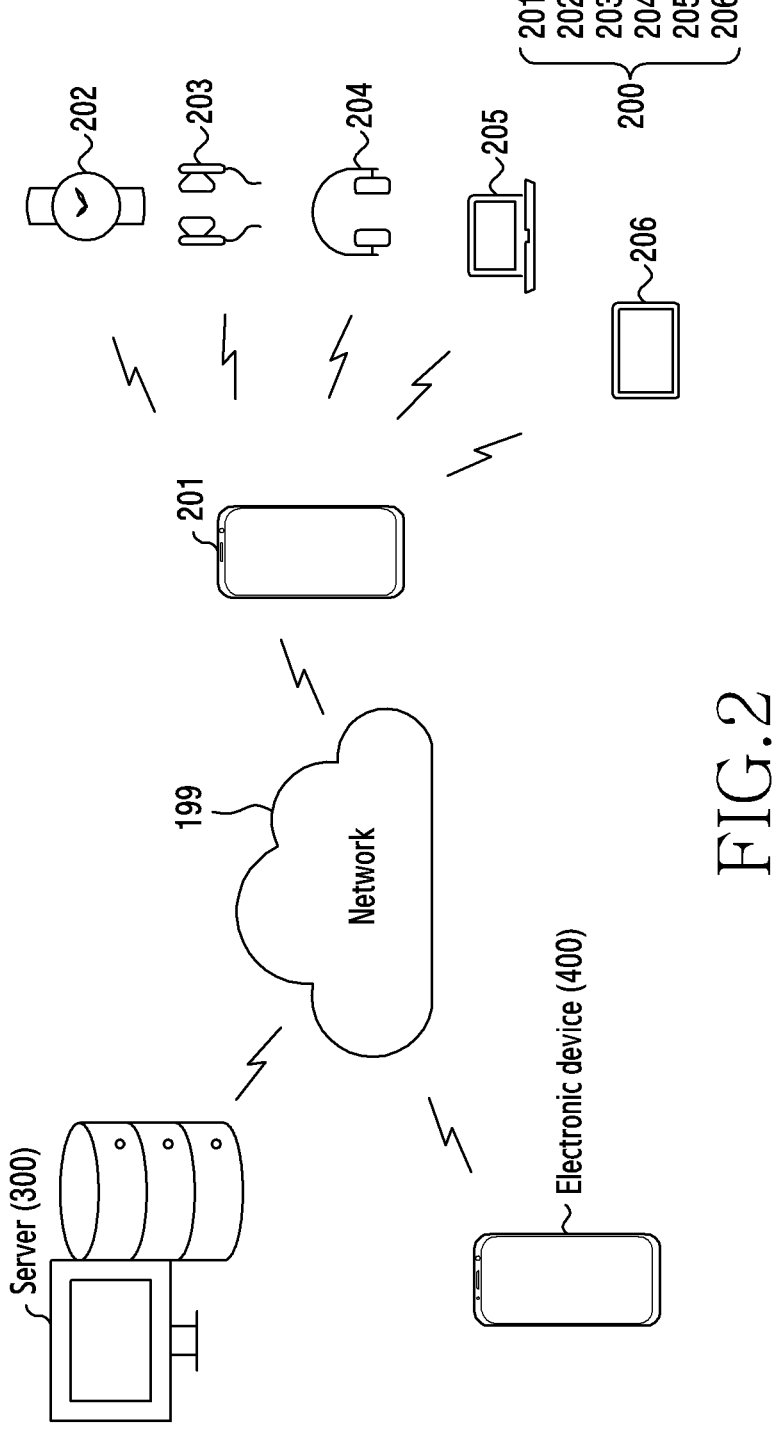
FIG. 2 is a diagram illustrating an example system for identifying a location of a user device according to various embodiments.

FIG. 2 is a diagram illustrating an example system for identifying a location of a user device according to various embodiments.

Referring to FIG. 2, a system according to an embodiment may include user devices 200, a server 300, and an electronic device 400. At least one of the user devices 200 and the electronic device 400 may be connected to the server 300 through a second network 199 (e.g., Wi-Fi or cellular network).

In an embodiment, the user devices 200 may include a plurality of devices. For example, in addition to a first device 201 that a user mainly uses, the user may further possess at least one of a second device 202, a third device 203, a fourth device 204, a fifth device 205, and a sixth device 206. The first device 201 may be, for example, and without limitation, a mobile communication device such as a smart phone. The second device 202 may be, for example, and without limitation, a wearable device such as a smart watch. The third device 203 may be, for example, and without limitation, a Bluetooth earphone such as earbuds. The fourth device 204 may be, for example and without limitation, a Bluetooth headphone or headset. The fifth device 205 may be, for example, and without limitation, a notebook computer. The sixth device 206 may be, for example, and without limitation, a tablet. In addition to the example shown in FIG. 2, the user may interlock and use appropriate devices other than the first device 201. For example, and without limitation, a key fob, a wallet, a backpack, a dog or cat identification device, an automobile, a bicycle, an identification card, a briefcase, an umbrella, etc., and/or other gear may also be associated with the first device 201 as long as they meet the communication function described in this disclosure, and when they are lost, the first device 201 may perform location tracking. In addition, in various embodiments, a user may use two or more of the same device. For example, a user may use a plurality of smart phones (e.g., the first device 201) by interlocking with each other. In addition, the user may use two or more tablets (e.g., the sixth device 206) in association with the first device 201.

In an embodiment, the user devices 200 may be connected to each other using a predetermined or specified communication protocol. For example, the first device 201 may be connected to the at least one of the second device 202, the third device 203, the fourth device 204, the fifth device 205, and the sixth device 206 through a near field network. For example, a network (e.g., a near field network) for establishing a connection between the user devices 200 may be appropriately selected. For example, Bluetooth low energy (BLE), Wi-Fi direct, near field communication (NFC), ultra-wide band (UWB) communication, or infrared communication with or instead of Bluetooth may be used to establish a connection between the user devices 200. In addition, according to an embodiment, the user devices 200 may establish a connection using a mesh network (e.g., Zigbee or Z-Wave) through near field wireless communication.

In an embodiment, in addition to the first device 201, the at least one of the second device 202, the third device 203, the fourth device 204, the fifth device 205, and the sixth device 206 may be directly connected to the server 300 through the second network 199. For example, an arbitrary user device may establish a connection with the second network 199 stand-alone without relying on the first device 201.

In an embodiment, the user devices 200 may have various methods for connecting to each other according to device information (e.g., device components). For example, when the at least one of the user devices 200 is an IP-based (IP address) device, a connection with the second network 199 may be established using a service set identifier (SSID), and when the at least one of the user devices 200 is not the IP-based device (e.g., BLE, Zigbee, or Z-wave), a connection with the second network 199 may be established using a user device (e.g., the first device 201) or a hub device (not shown).

In an embodiment, the at least one of the user devices 200 may broadcast an advertising packet for providing a finding function at the time of being lost. For example, when it is determined that the second device 202 is lost, the second device 202 may broadcast a packet including various types of information including identification information on the second device 202. The packet may be broadcast to be received by electronic devices located within a predetermined communication range other than the second device 202. In various embodiments of the disclosure, a packet or an advertising packet may be understood as referring, for example, to a signal, message, or beacon capable of recognizing that a device has been lost.

In an embodiment, the at least one of the user devices 200 may determine whether it is lost according to various criteria. For example, in a case in which a first time (e.g., 48 hours) has elapsed since a time when the second device 202 was last connected to the first device 201, which is a parent terminal or a main terminal, and/or a case in which a second time (e.g., 24 hours) shorter than the first time has elapsed since the time when the second device was last connected to the first device 201 but the remaining battery level falls below a reference value (e.g., 30%), it may be determined that the second device 202 is lost. Various loss determination criteria may be applied to the first time, the second time, and/or the remaining battery level according to a user configuration or a manufacturer's standard and are not limited to the foregoing examples.

In various embodiments, the description of the electronic device 101 with reference to FIG. 1 may be appropriately applied to the user devices 200. For example, when the first device 201 of the user is a smartphone, the first device 201 and the electronic device 101 may be the same device. In addition, for example, when the third device 203 of the user is earbuds without a display, other descriptions except for the display module 160 in the description of the electronic device 101 may be appropriately applied to the third device 203.

In an embodiment, the server 300 may correspond to the server 108 of FIG. 1. When the user loses any one of the user devices 200, the server 300 may provide a function of confirming the location of the lost device. In various embodiments, for convenience of description, a non-limiting example in which the first device 201 confirms the location of the second device 202 when the second device 202 among the user devices 200 is lost will be described.

In an embodiment, the electronic device 400 may be a device of a user different from the owner of the second device 202. The electronic device 400 may directly or indirectly obtain an advertising packet broadcasted from the second device 202 in the vicinity of the lost second device 202. The electronic device 400 may include a near field communication circuit for receiving a signal broadcasted by the lost second device 202 using a near field communication technique (e.g., BLE). In addition, the electronic device 400 may include a location measuring circuit (e.g., a GPS circuit) for measuring its own position. In addition, the electronic device 400 may include a telecommunication circuit (e.g., a communication circuit supporting a cellular network and/or a Wi-Fi network) for transmitting information about the second device 202 and its location to the server 300.

In an embodiment, the electronic device 400 may also be a device (e.g., a smartphone) of the same type as the first device 201. Accordingly, some or all of the description of the electronic device 101 described with reference to FIG. 1 may also be applied to the electronic device 400. In addition, descriptions of the configuration or function of the first device 201 in this disclosure may also be applied to the electronic device 400. However, the disclosure is not limited thereto, and the electronic device 400 may be an arbitrary electronic device supporting the above-described communication function.

Figure 3:
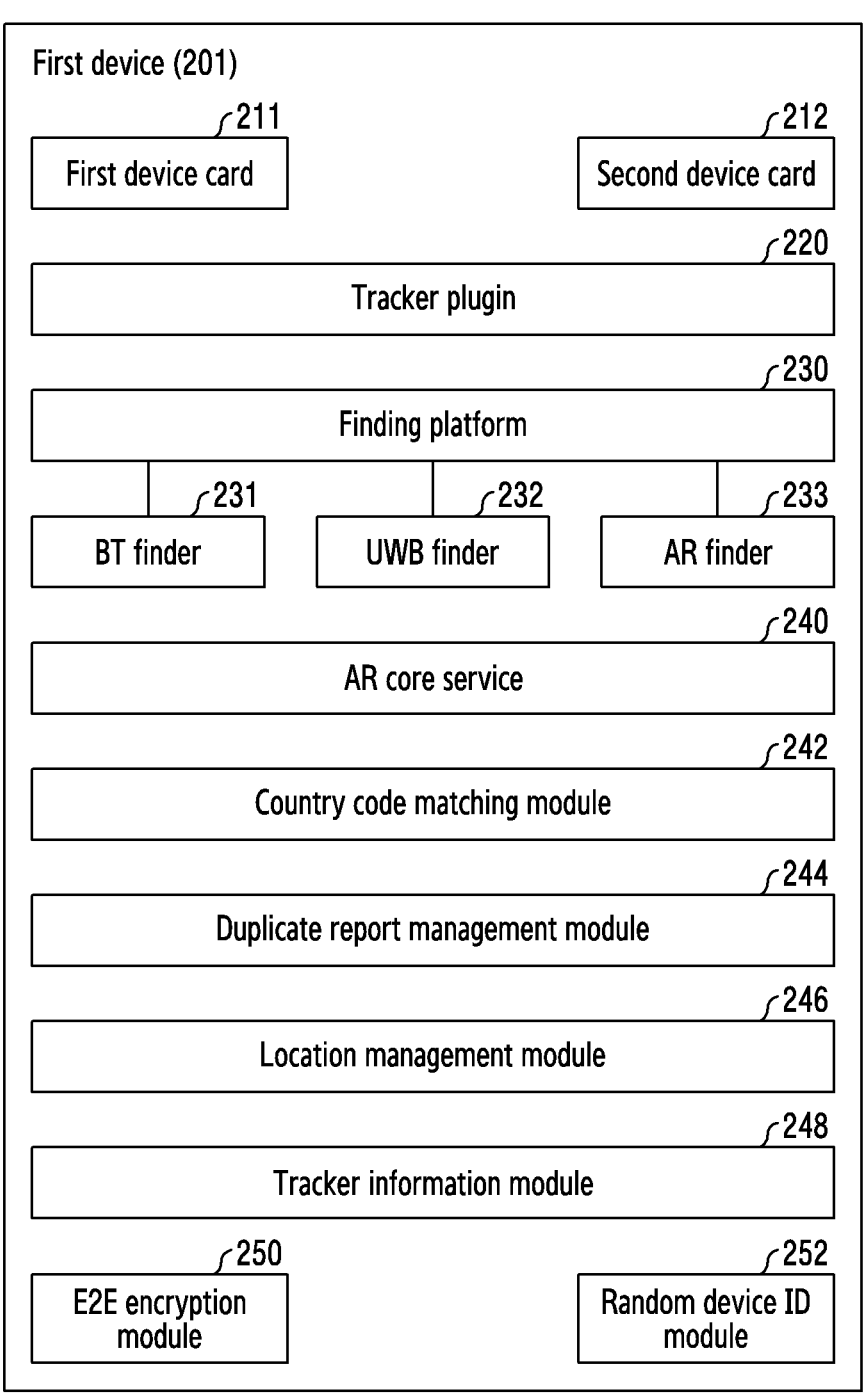
FIG. 3 is a diagram illustrating various example modules related to various functions of an electronic device according to various embodiments.

FIG. 3 is a diagram illustrating various example modules related to various functions of an electronic device according to various embodiments.

Various functions described in FIG. 3 may be understood as functions supported by the first device 201 in terms of finding a lost device. In addition, the various functions described in FIG. 3 may be understood as functions supported by the electronic device 400 in terms of processing an advertising packet obtained from the lost device. As described above, the first device 201 and the electronic device 400 are merely classified according to whether the corresponding device is a device of a user looking for the lost device or a device of a user who helps to find the lost device. The function described in FIG. 3 may be provided in both the first device 201 and the electronic device 400. Hereinafter, the first device 201 will be described by way of non-limiting example as a reference.

A function or operation described with reference to FIG. 3 may be understood as a function performed by the processor of the first device 201. The processor may execute instructions stored in the memory to implement a software module shown in FIG. 3, and may control hardware (e.g., the communication module 180 of FIG. 1) associated with the function. For example, the various example modules may include various processing circuitry and/or executable program instructions for providing the various functions.

In an embodiment, the first device 201 may manage at least one device card. For example, a first device card 211 for the first device 201 may be registered in the first device 201. In addition, a second device card 212 for the second device 202 having a history of interlocking with the first device 201 may be registered in the first device 201. The device card (e.g., the first device card 211 or the second device card 212) may include, for example, and without limitation, device name and/or identification information, device status, device battery information, device location history and/or device current status, a message related to the corresponding device, or the like. In an embodiment, information included in the first device card 211 and/or the second device card 212 may be configured and/or changed by a user. For example, the user of the first device 201 and/or the second device 202 may configure a name associated with the first device 201 and/or the second device 202, a device type (e.g., type), or policy information.

In an embodiment, the first device 201 and the second device 202 may share the same user account, and the first device card 211 and the second device card 212 may be registered for the same user account. For example, when an input for confirming the locations of the user devices interlocked with the first device 201 by the user of the first device 201 is received, the first device 201 may provide a user interface (UI) showing information about the first device card 211 and the second device card 212 stored in the memory to a display (e.g., the display module 160 of FIG. 1). An example UI will be described in greater detail below with reference to FIG. 7.

In an embodiment, the first device 201 and the second device 202 may have different user accounts. When the first device 201 and the second device 202 have different user accounts and it is determined that they are trusted devices, the first device card 211 and the second device card 212 can be registered for the same user account. For example, when it is determined that a first user of the first device 201 and a second user of the second device 202 are in a family relationship with each other, information about the second device 202 may be identified through a first user account of the first user of the first device 201. Hereinafter, the same user reference will be described for convenience of description, but various embodiments may be applied even when users of the first device 201 and the second device 202 are different from each other.

In an embodiment, a tracker plugin 220 may be understood as a module for registering a user device. For example, the first device 201 may drive the tracker plugin 220. The tracker plugin 220 may provide an easy setup pop-up, registration using, for example, a QR code (QR triggering), or a manual onboarding function. For example, the user can interlock the second device 202 with the user account to register the second device 202 in the server 300 by photographing a QR code attached to one side of the second device 202 or a product case using a camera (e.g., the camera module 180 of FIG. 1) mounted on the first device 201.

In an embodiment, a finding platform 230 may perform a function for finding a lost device. The finding platform 230 may control hardware to effectively find the lost device according to a distance from the lost device. For example, the finding platform 230 may operate with a BT finder 231, a UWB finder 232, and/or an AR finder 233. The BT finder 231 may control a Bluetooth communication circuit, the UWB finder 232 may control a UWB communication circuit, and the AR finder 233 may control a display.

In an embodiment, the BT finder 231 may operate when a distance between the first device 201 and the second device 202 is within a first distance (e.g., about 100 m). The finding platform 230 may control the BT finder 231, and may receive a packet from the second device 202 using a near field communication circuit supporting Bluetooth communication and/or BLE communication, or may establish a near field communication connection with the second device 202 when the distance between the first device 201 and the second device 202 is within the first distance.

In an embodiment, the UWB finder 232 may operate when the distance between the first device 201 and the second device 202 is within a second distance (e.g., about 50 m) that is less than the first distance. The finding platform 230 may control the UWB finder 232 to activate a UWB communication circuit connected to a plurality of UWB antennas to receive a signal of a UWB channel used for positioning. The finding platform 230 may receive the UWB signal received from the second device 202 using the UWB communication circuit, and may estimate the location of the second device 202 based on an arrival time and/or arrival angle of the signal received by each of the plurality of UWB antennas.

In an embodiment, the AR finder 233 may visually assist the user in locating the second device 202 by implementing AR on the display when the second device 202 is in close proximity Here, the term "close proximity" may refer, for example, as being substantially equal to the second distance or within a third distance shorter than the second distance. The finding platform 230 may output image data acquired through the camera to the display, and may control the AR finder 233 to display the location of the second device 202 identified through the UWB finder 232 on a screen output on the display. In addition, when the first device 201 fails to effectively receive the UWB signal from the second device 202 (e.g., when the reception sensitivity is equal to or less than a threshold value), the AR finder 233 may guide the first device 201 through the display to have a posture (angle) suitable for receiving the UWB signal.

In an embodiment, when the AR finder 233 operates, an AR core service 240 may be activated together. The AR core service 240 may control the first device 201 to access a person/object recognition database stored in the memory and/or an AR service providing server to enhance an AR environment.

In an embodiment, the BT finder 231, the UWB finder 232, and/or the AR finder 233 included in the finding platform 230 may operate simultaneously or selectively based on a distance from the second device 202. For example, when the distance between the first device 201 and the second device 202 is the second distance (e.g., within about 50 m), the BT finder 231 and the UWB finder 232 may operate simultaneously or the UWB finder 232 may selectively operate.

In an embodiment, a country code matching module 242 may determine, when the first device 201 receives an advertising packet from an arbitrary lost device (e.g., the second device), a country for proving information about the lost device or a server belonging to the country. For example, the country code matching module 242 may operate when the first device 201 serves as the electronic device 400 (e.g., serves as a user's device providing assistance in locating the lost device). In an embodiment, when the first device 201 (or the electronic device 400) determines the country or the server belonging to the country, the country code included in the server (e.g., the server 300 of FIG. 4), that is, data of a server matching database (DB) 330 may be used. For example, the first device 201 (or the electronic device 400) may store data of the country code acquired from the server 300, that is, the data of the server matching DB 330, and may transmit the data to the second device 202 connected to the first device 201 (or the electronic device 400). According to an embodiment, the first device 201 (or the electronic device 400) may store data (e.g., country code—server matching DB) related to a country or its affiliation through a process of the device or software upgrade. For example, the first device 201 (or the electronic device 400) may perform over the air (OTA) software update as the software upgrade. For example, the OTA software update may include an open mobile alliance (OMA) download, a firmware OTA (FOTA), or a plain FTP (FTP).

In an embodiment, when the first device 201 receives the advertising packet from the arbitrary lost device, a duplicate report management module 244 may manage an operation of re-broadcasting or reporting the received advertising packet to the server. For example, the duplicate report management module 244 may perform the operation of reporting/re-broadcasting the received advertising packet to the server when the advertising packet received from the arbitrary lost device satisfies a predetermined condition, and may not perform the same when the advertising packet does not satisfy the predetermined condition. For example, the duplicate report management module 244 may operate when the first device 201 serves as the electronic device 400.

In an embodiment, a location management module 246 may manage the current location and/or location change history of the second device 202 obtained from the server 300. In addition, the location management module 246 may control a location measuring circuit such as a GPS included in the first device 201 to confirm and/or manage the location of the first device 201.

In an embodiment, a tracker information module 248 may manage the type of the second device 202 and/or identification information on the second device 202. The tracker information module 248 may operate when the first device 201 serves as the electronic device 400. For example, the tracker information module 248 may store and/or manage the device type (e.g., smart watch, earphone, headphone, or tablet), the communication type (e.g., whether to support BLE, whether to support Bluetooth, whether to support cellular network, or whether to support UWB communication), and/or identification information (e.g., device unique ID, network identification ID, or user-defined ID) of the second device 202.

In an embodiment, an E2E encryption module 250 may perform end-to-end encryption. The E2E encryption module 250 may operate when the first device 201 serves as the electronic device 400. For example, in response to the fact that the electronic device 400 receives the advertising packet from the arbitrary lost device (e.g., the second device 202), when transmitting a message including identification information of the lost device and the location information of the electronic device 400 to the server 300, the E2E encryption module 250 may apply an encryption algorithm to the message. When the E2E encryption module 250 encrypts the message using an encryption key associated with the lost device, a device having a decryption key corresponding to the encryption key of the lost device may obtain the location information of the lost device. For example, when the electronic device 400 encrypts the message including the identification information on the second device 202 and the location information of the electronic device 400 with a public key of the second device 202 and transmits the encrypted message to the server 300, the first device 201 may obtain encrypted information about the lost second device 202 from the server 300 and may decrypt the obtained information with a private key of the second device 202 to confirm the location (=the location of the electronic device 400) of the second device 202. For example, the first device 201 may obtain the private key of the second device 202 in the process of registering the second device 202 in the user account, registering the same in the server 300, or performing pairing with the second device 202.

In an embodiment, a random device ID module 252 may change an identification ID of the corresponding device to a random ID using a predetermined algorithm. The random device ID module 252 may operate when the first device 201 serves as the electronic device 400. For example, when the electronic device 400 receives the advertising packet from the second device 202, the electronic device 400 may change the identification ID of the second device 202 to a random ID to transmit a message to the server 300. The first device 201 may identify the ID of the second device 202 from the random ID using the predetermined algorithm.

Figure 4:
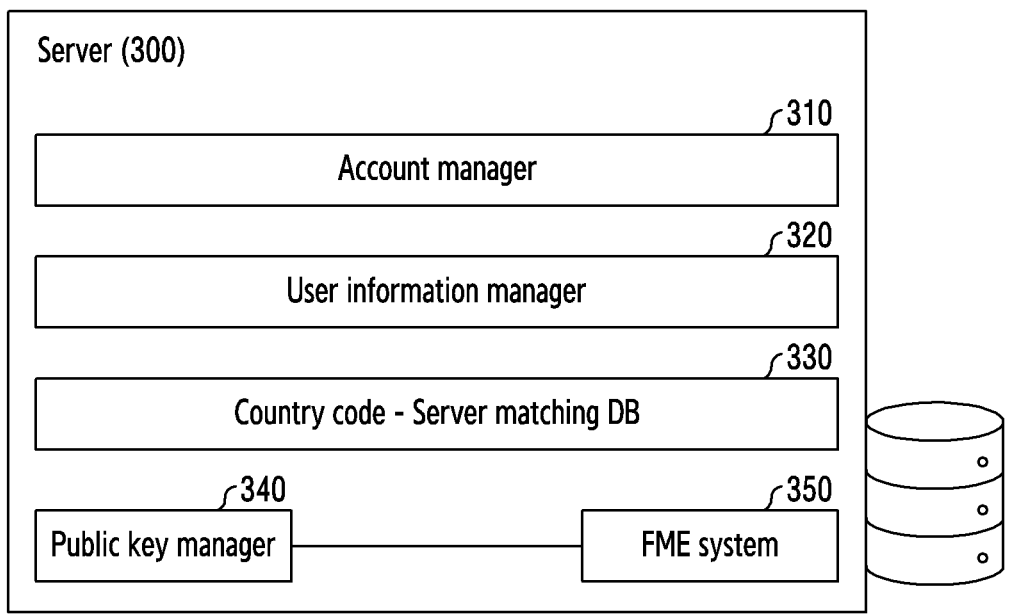
FIG. 4 is a diagram illustrating various example modules related to various functions of a server according to various embodiments.

FIG. 4 is a diagram illustrating example modules related to various functions of a server according to various embodiments.

Referring to FIG. 4, the server 300 may include an account manager 310, a user information manager 320, a country code-server matching database (DB) 330, a public key manager 340, and a Find My Everything (FME) system 350. The components of the server 300 shown in FIG. 4 are classified from a functional point of view to implement various embodiments, and the server 300 may be implemented through a plurality of hardware running various software (e.g., a plurality of processors and storage devices for a server). In addition, the server 300 may be understood as a plurality of servers. For example, the server 300 may include a first server for providing a lost device finding service in a first country and a second server for providing a lost device finding service in a second country.

In an embodiment, the server 300 may include the account manager 310. The account manager 310 may manage a user account registered in the server 300 and/or at least one device connected to the user account. For example, when the first device 201, the second device 202, and the third device 203 are registered with the first user account, since the first device 201 and the second device 202 are linked to the same first user account, the account manager 310 may allow the first device 201 to access information about the second device 202 even if a request related to the second device 202 is received from the first device 201.

In an embodiment, the server 300 may include the user information manager 320. The user information manager 320 may manage registration, addition, deletion, and/or modification of user information associated with the user account.

In an embodiment, the country code-server matching DB 330 may maintain and update a database matching a country code and a server providing a lost device finding service. For example, the server 300 may manage the country code-server matching DB 330 with the latest data, and may provide information about the server connected to the country code to at least one of devices registered with the user account in the server 300 when a change occurs. For example, the server 300 may provide the database to the first device 201 or the electronic device 400 registered in the server 300. In an embodiment, the electronic device 400 may determine a server to which the corresponding location information is to be provided based on country information included in the advertising packet obtained from the lost device.

In an embodiment, the country code may be based on international telephone country codes indicating countries. For example, the United States has an international phone country code of +1, the Republic of Korea has +82, Vietnam has +84, UK has +44, etc. In this case, the country code-server matching DB 330 may include data shown in Table 1.

TABLE 1

| Country | Country code | Server address |
|---|---|---|
| The Republic of Korea | 82 | 168.121.63.2 |
| United states | 1 | 164.124.101.2 |
| Vietnam | 84 | 180.182.54.1 |
| UK | 44 | 149.112.132.1 |
| Japan | 81 | 120.123.222.1 |
| Philippine | 63 | 180.124.191.2 |
| . . . | . . . | . . . |

In various embodiments, the country codes are not limited to the international phone country codes, and may be arbitrary information that can identify a country. For example, an alphabetical country code such as a domain code (e.g., The Republic of Korea-KR, the United States-US, or France-FR), or a format (e.g., Germany-262, the Republic of Korea-450, or France-208) such as a mobile country code (MCC) can also be used as the country code. In addition, the above-described method of indicating the country code is merely an example, and the country code may be expressed in bits.

In an embodiment, the public key manager 340 may manage public keys of devices registered in the server 300. The public key may be managed in units of user accounts or may be managed in units of devices. For example, one public key may be configured per one user account. As another example, when five devices are connected with the same user account, five different public keys may be assigned to each of the five devices.

In an embodiment, the FME system 350 may perform a process for providing the lost device finding service. For example, when the FME system 350 receives a request for the public key for the lost second device 202 from the electronic device 400, the FME system 350 may obtain the public key for the second device 202 from the public key manager 340, and may provide the obtained public key to the electronic device 400. For example, the FME system 350 may identify the user account in which the second device 202 is registered through the account manager 310. In addition, the FME system 350 may identify a country corresponding to the user account and/or the second device 202 through the user information manager 320. In addition, the FME system 350 may determine whether a request from the electronic device 400 is transmitted to a server of an appropriate country through the country code-server matching DB 330. When the country designation is incorrect, or when the information about the second device 202 cannot be identified, the FME system 350 may provide at least a portion of the data stored in the country code—server matching DB 330 to the electronic device 400. For example, the FME system 350 may maintain the database matching the country code and the server providing the lost device finding service up to date, and may provide at least a portion of the updated data to the electronic device 400.

Figure 5:
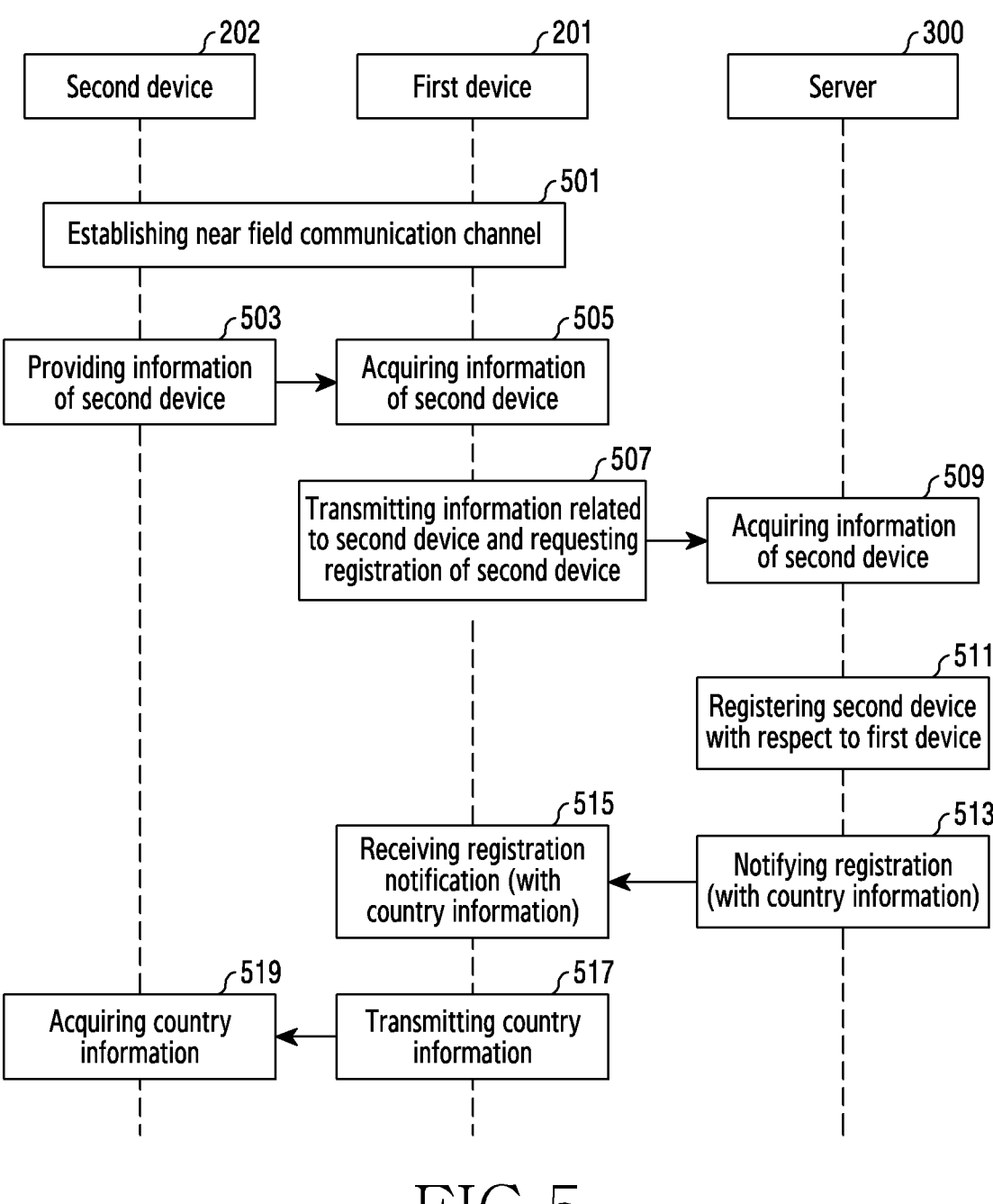
FIG. 5 is a signal flow diagram illustrating an example of registering a second device by a first device in a server, according to various embodiments.

FIG. 5 is a signal flow diagram illustrating an example operation of registering a second device by a first device in a server, according to various embodiments.

Referring to FIG. 5, in operation 501, the first device 201 and the second device 202 may establish a near field communication channel. For example, the near field communication channel may be a device-to-device connection such as Bluetooth or Wi-Fi direct, but is not limited thereto.

According to an embodiment, in operation 503, the second device 202 may provide information on the second device 202 to the first device 201 through the near field communication channel. The information on the second device 202 may include, for example, the type of the second device 202 (e.g., smart watch or tablet), unique identification information (e.g., device ID), the manufacturer of the second device 202, hardware information on the second device 202 (e.g., processor performance, memory capacity, and/or battery capacity), software information on the second device 202 (e.g., operating system type and version, installed applications, and/or whether to support device finding service), and/or information on communication performance (e.g., whether to support Bluetooth, whether to support BLE, whether to support UWB, whether to support cellular, whether to support Wi-Fi, whether to support NFC, and/or whether to support MST).

According to an embodiment, in operation 505, the first device 201 may obtain (e.g., acquire) the information on the second device 202. The first device 201 may store the obtained information on the second device 202 in the memory (e.g., the memory 130 of FIG. 1) of the first device 201.

According to an embodiment, in operation 507, the first device 201 may transmit the information on the second device 202 to the server 300 and may request registration of the second device 202. For example, the first device 201 may transmit a message of a specified format to the server 300, and the message of the designated format may include information of the first device 201, user information of the first device 201, a registration request of the second device 202, and/or the information on the second device 202. For example, when the first device 201 is registered with a first user account registered in the server 300, the first device 201 may transmit the message to the server 300 to request registration of the second device 202 with the first user account. As another example, when the first device 201 is registered with the first user account registered in the server 300 and the second device 202 is registered with a second user account registered in the server 300, the first device 201 may transmit the message to the server 300, thereby requesting registration with a third user account (e.g., group account) including the first user account and the second user account, and requesting deletion of the information on the second device 202 registered with the second user account and registration of the second device 202 with the first user account.

According to an embodiment, in operation 509, the server 300 may obtain the information on the second device 202 from the first device 201. The server 300 and the first device 201 may be connected to each other through a predetermined network (e.g., a cellular network or a Wi-Fi network), and the server 300 may obtain the information on the second device 202 transmitted from the first device 201 through the predetermined network.

According to an embodiment, in operation 511, the server 300 may register the second device 202 with respect to the first device 201. For example, the account manager 310 of the server 300 may also use the information obtained from the first device 201 to register the second device 202 with respect to a first user account corresponding to the first device 201.

According to an embodiment, in operation 513, the server 300 may transmit a notification indicating that the second device 202 has been registered to the first device 201. The notification may include country information for the second device 202. For example, when the server 300 provides a service in the Republic of Korea, the second device 202 may include country information corresponding to the Republic of Korea. As another example, when the country information of the first user account registered in the server 300 is the Republic of Korea, the country information of all user devices 200 registered for the first user account may be configured to the Republic of Korea.

According to an embodiment, in operation 515, the first device 201 may receive a registration notification from the server 300. The registration notification may contain country information. However, in an embodiment, when the country information of the second device 202 has been already registered in the second device 202 at the time of manufacturing the second device 202, or when the first device 201 directly configures the country information of the first device 201 or the country information of the user account of the first device 201 as the country information of the second device 202, the country information may be omitted in the registration notification received from the server 300.

In an embodiment, operations 501 to 515 may be referred to as a registration procedure or an onboarding procedure of the second device 202. In addition, according to an embodiment, the registration procedure or the onboarding procedure may include a procedure of storing identification information (ID) of the second device 202 (e.g., tracker) in the server 300.

According to an embodiment, in operation 517, the first device 201 may transmit the country information to the second device 202. As described above, the country information may be received from the server 300, or may be country information (e.g., country information registered for the first device 201 or country information corresponding to the user account of the first device 201) known (or stored) by the first device 201.

According to an embodiment, in operation 519, the second device 202 may obtain (e.g., acquire) the country information from the first device 201. In addition, in an embodiment, the country information of the second device 202 may be already registered in a storage space (e.g., the memory 130 of FIG. 1) of the second device 202. In an embodiment, when the second device 202 already knows its own country information, operations 517 and 519 may be omitted. For example, the first device 201 may know that the country information of the second device 202 has been already registered through operations 503 and 505. The second device 202 may broadcast an advertising packet including the country information in a lost state, which will be described later.

Figure 6:
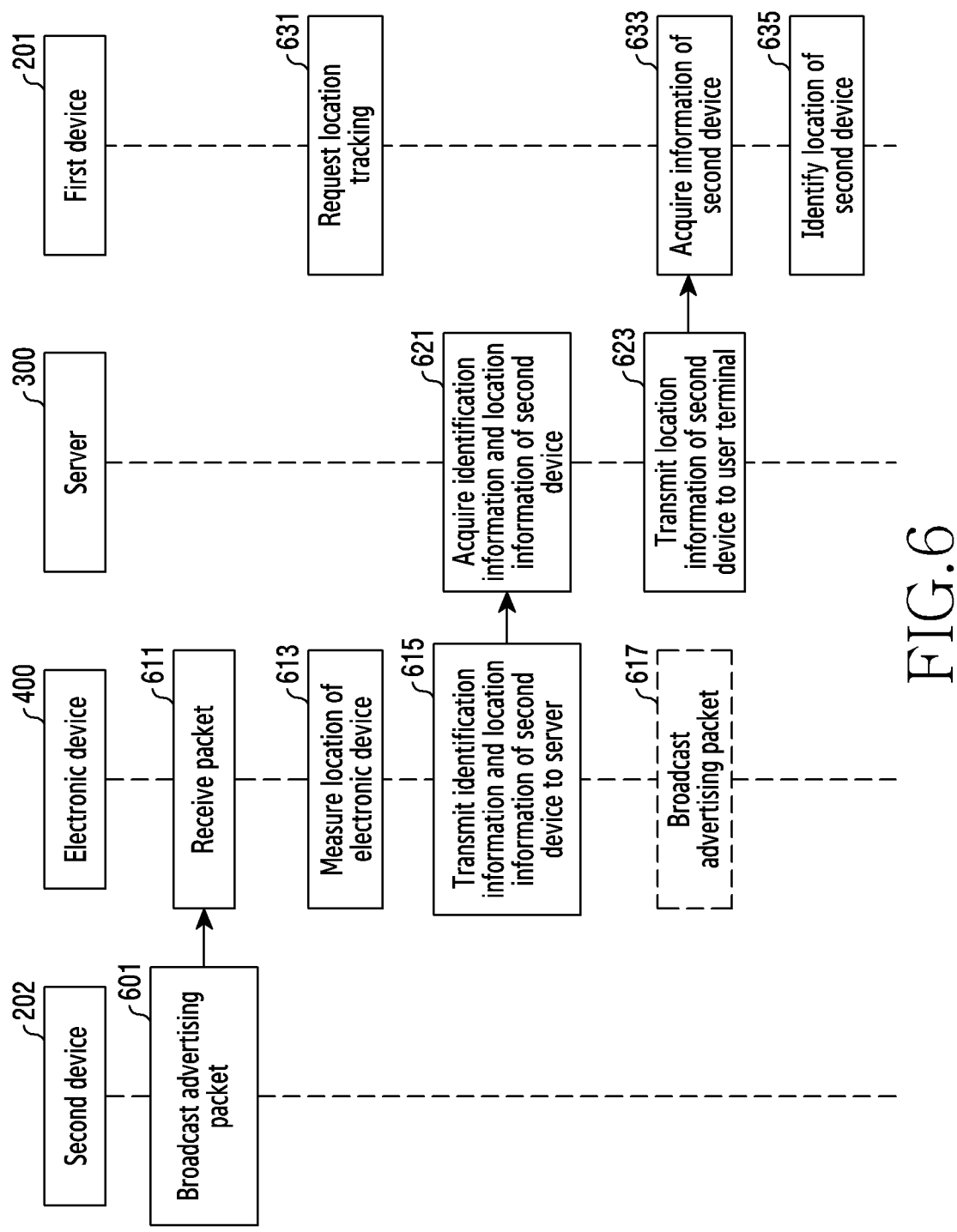
FIG. 6 is a signal flow diagram illustrating an example of tracking the current location of a lost device in a finding system according to various embodiments.

FIG. 6 is a signal flow diagram illustrating an example operation of tracking the current location of a lost device in a finding system according to various embodiments. For reference, FIG. 6 illustrates a situation in which the first device 201 and the second device 202 share the same user account in the system of FIG. 2, and among them, the second device 202 is lost. The electronic device 400 is an arbitrary device independent of the user of the first device 201, and may be understood as a device located within a distance capable of receiving a packet broadcasted from the second device 202.

According to an embodiment, in operation 601, the second device 202 may broadcast the advertising packet using a designated communication protocol. The designated communication protocol may correspond to a type of low power-near field communication protocol in order to minimize and/or reduce battery consumption. For example, the designated communication protocol may be BLE.

In an embodiment, the second device 202 may broadcast the advertising packet upon detecting that the second device 202 is in a lost state. As described above, various conditions for determining that the second device 202 is in the lost state may be configured. However, in an embodiment, the second device 202 may broadcast the advertising packet regardless of detecting that the second device 202 is in the lost state. For example, the second device 202 may repeatedly broadcast the advertising packet for a predetermined time (e.g., 15 minutes) every predetermined period (e.g., 1 hour). As another example, the second device 202 may repeatedly broadcast the advertising packet for a predetermined time every designated time (e.g., a user configuration time).

According to an embodiment, in operation 611, the electronic device 400 may receive the advertising packet broadcasted by an external device. For convenience of description, it is assumed below that the advertising packet broadcasted by the second device 202 is received.

In an embodiment, the electronic device 400 may include various communication circuits. For example, the electronic device 400 may include a first wireless communication circuit supporting near field communication for receiving an advertising packet. In addition, the electronic device 400 may include a second wireless communication circuit supporting long-distance communication (e.g., cellular communication) for communicating with the server 300. In addition, the electronic device 400 may include a location measuring circuit (e.g., GPS) for measuring its own location. The location measuring circuit may include a positioning system using a base station or an access point (AP) of Wi-Fi or a positioning system using an NFC beacon, in addition to a positioning system using satellite navigation such as GPS.

In an embodiment, since the advertising packet broadcasted by the second device 202 uses a designated near field communication protocol, the reception of the advertising packet may refer, for example, to the second device 202 and the electronic device 400 being within a communication distance allowed by the near field communication protocol. For example, when the electronic device 400 receives the advertising packet through BLE, the electronic device 400 may be estimated to be located within about 100 m from the second device 202. Accordingly, from a macroscopic point of view, the location of the electronic device 400 may be treated the same as the location of the second device 202.

According to an embodiment, in operation 613, the electronic device 400 may measure the location of the electronic device 400 using the location measuring circuit. The electronic device 400 may determine the location (e.g., latitude and/or longitude coordinates) of the electronic device 400 based on the measurement result.

According to an embodiment, in operation 615, the electronic device 400 may transmit the measured location information and the identification information of the second device 202 to the server 300. For example, the electronic device 400 may transmit a message including the identification information (e.g., unique ID and/or serial number) and location information of the second device 202 to the server 300 using the above-described second wireless communication circuit. The electronic device 400 may specify that the location information included in the message is the location information of the electronic device 400, but may allow the message to simply include the location information itself without specifying the subject of the location information.

According to an embodiment, in operation 617, the electronic device 400 may broadcast the advertising packet after transmitting the message to the server 300. For example, the advertising packet obtained by the electronic device 400 from the second device 202 is referred to as a first packet, and the advertising packet broadcasted again by the electronic device 400 is referred to as a second packet. Then, the second packet may include substantially the same or less content (data) than the first packet. However, the electronic device 400 may allow some fields of the second packet to have a value different from that of the first packet. For example, the electronic device 400 may configure different multi-hop count field values to indicate that the electronic device 400 is an indirect propagator rather than a direct propagator of the advertising packet. For example, when the multi-hop count of the first packet is n, the multi-hop count of the second packet may be configured to n+1. In an embodiment, the multi-hop count of the advertising packet directly generated by the second device 202 may be configured to zero (e.g., n=0). According to an embodiment, the second packet generated based on the first packet may be defined in a format partially different from that of the first packet. For example, in the format of the second packet, at least some fields among a plurality of fields included in the format of the first packet may be omitted.

In various embodiments, the electronic device 400 may broadcast the advertising packet before transmitting the message to the server 300 or substantially simultaneously with the transmitting. In addition, operation 617 may not be performed.

According to an embodiment, in operation 621, the server 300 may acquire a message including the identification information and location information of the second device 202 from the electronic device 400. When there is a request (e.g., operation 631) for tracking the location of the second device 202 from the first device 201 before and/or after the acquisition of the message, in operation 623, the server 300 may transmit the location information of an external device (e.g., the second device 202) to the first device 201. For example, in operation 631, the first device 201 may transmit the request for tracking the location (or confirming the location) of the second device 202 to the server 300, and the server 300 may transmit information about the location of the second device 202 identified by the first device 201 in response to the request received from the first device 201 in operation 623. For example, the server 300 may transmit the most recently confirmed information about the location of the second device 202 to the first device 201. In operation 633 the first device 201 may acquire information of the second device 202 transmitted the server 300 in operation 623.

According to an embodiment, in operation 635, the first device 201 may acquire the location information on the second device 202 from the server 300. In operation 635, the first device 201 may determine the location of the second device 202 based on the information acquired from the server 300. Operations 631, 633, and/or 635 may be implemented through an application providing a location confirmation service installed in the first device 201. In this regard, a description will be made with reference to FIG. 7.

According to an embodiment, in operation 621, when the identification information and location information of the second device 202 are acquired from the electronic device

400, the server 300 may determine whether a location tracking request (e.g., operation 631) is received from the first device 201 that has registered the second device 202 in the server 300 with the first account or from another device having the first account. For example, when the location tracking request (e.g., operation 631) is not received from the first device 201, the server 300 may not perform operation 623. According to an embodiment, although not shown, the server 300 may transmit a response message to the electronic device 400 based on whether the location tracking request (e.g., operation 631) is received from the first device 201. For example, when the location tracking request (e.g., operation 631) is received from the first device 201, the server 300 may transmit, to the electronic device 400, a response message indicating that the identification information and location information of the second device 202 have been transmitted to the first device 201. As another example, when the location tracking request (e.g., operation 631) is not received from the first device 201, the server 300 may request the electronic device 400 not to transmit the identification information and location information of the second device 202 for a designated time. According to an embodiment, the electronic device 400 may broadcast (e.g., operation 617) the advertising packet based on a response from the server 300.

Figure 7:
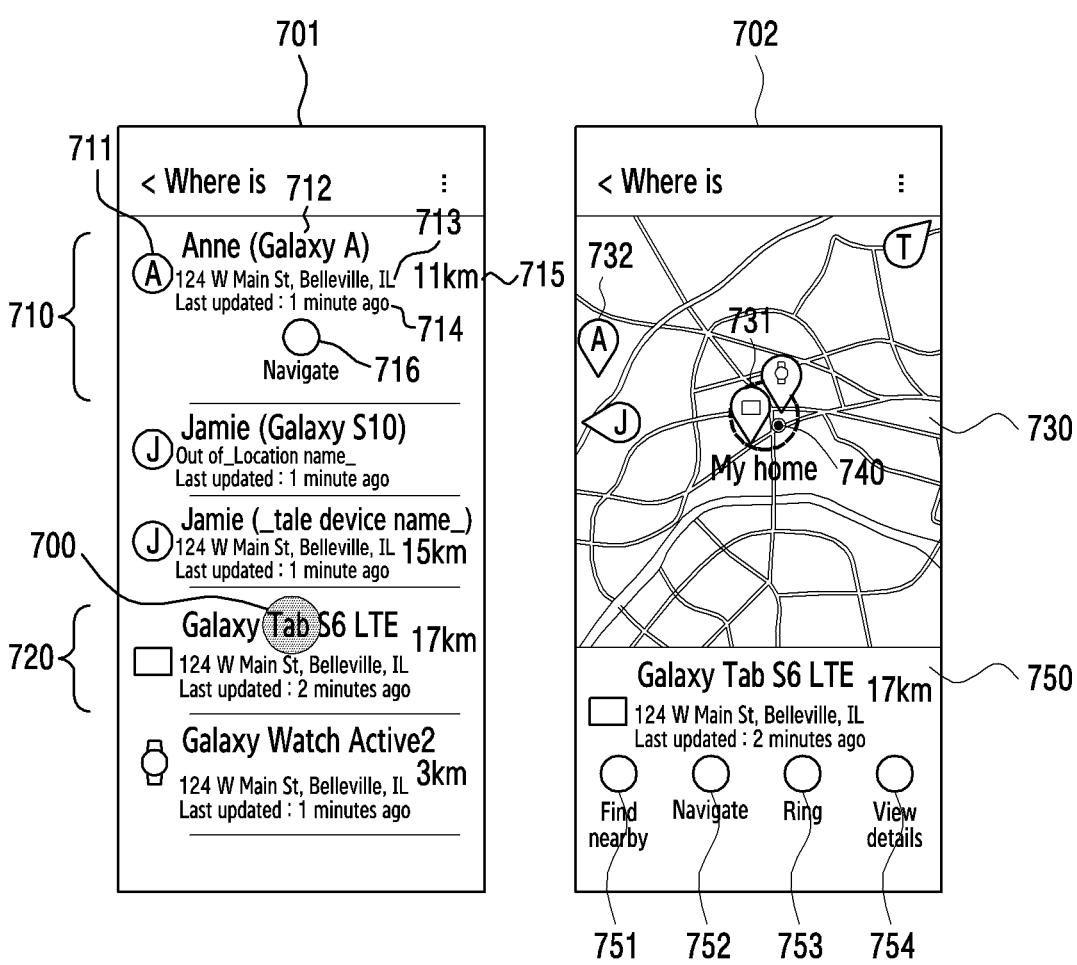
FIG. 7 is a diagram illustrating an example user interface for identifying locations of user devices in a first device according to various embodiments.

FIG. 7 is a diagram illustrating an example user interface for identifying locations of user devices in a first device according to various embodiments.

Referring to FIG. 7. a first screen 701 may be an execution screen of an application that provides a location confirmation service of the first device 201. The first device 201 may display information about user devices registered in the first device 201 in the form of a list. According to an embodiment, the first screen 701 may present a list including an item (not shown) corresponding to a first device card 211 and an item corresponding to a second device card 212. For example, the list of the first screen 701 may include a first item 710 corresponding to a smartphone (e.g., Galaxy A) representing the first device 201 registered with the user account of the first device 201, and a second item 720 corresponding to an arbitrary tablet (e.g., Galaxy Tab S6 LTE) registered with the user account. In the following description, the descriptions of the first item 710 and/or the second item 720 may be also applied to other items (e.g., Jamie (Galaxy S10)", "Jamie (_tale device name_), and/or "Galaxy Watch Active2")), which are not specified on the first screen 701.

In an embodiment, each item included in the list may include various types of information. For example, the first item 710 may include at least one of an icon 711 indicating the smartphone, a nickname (e.g., Anne) and model name (Galaxy A) 712 of the smartphone, the last confirmed location 713 (e.g., 124 W Main St, Belleville, IL), a time 714 when the corresponding location was last confirmed (e.g., Last updated: 1 minute ago), a distance 715 from the current location of the first device 201 to the smartphone 715, and a navigation menu 716 for executing a map application or a map function based on the current location of the first device 201 and the last confirmed location 713. Some items of the above-described contents may be omitted. For example, when the location of the device is not confirmed, at least some of the last confirmed location 713, the time 714 when the corresponding device was last confirmed, or the navigation menu 716 may not be displayed.

In an embodiment, the first device 201 may automatically perform operation 631 when the application is executed. In an embodiment, the first device 201 may perform operation 631 by a user input after the application is executed. In an embodiment, the first device 201 may perform operation 631 every predetermined period (e.g., 12 hours) and may update the locations of the user devices 200 registered in the first device 201.

In an embodiment, when a user input 700 for selecting the second item 720 from among several items included in the list occurs, the first device 201 may provide a second screen 702 to the display of the first device 201. The second screen 702 may be, for example, a UI generated based on the second device card 212.

In an embodiment, the second screen 702 may include a map area 730 and a second device card area 750. For example, the map area 730 may be displayed on an upper portion (area) of the second screen 702, and the second device card area 750 may be displayed on a lower portion (area) of the second screen 702. However, this is only an example, and the second device card area 750 may be disposed at a location different from the illustrated example. For example, the second device card area 750 may be provided in a floating form on a map occupying most of the second screen 702. In addition, the location or size of the second device card area 750 may be moved/enlarged/reduced by a user input.

In an embodiment, the locations of user devices confirmed through the server 300 may be displayed on the map area 730. The locations of the user devices may be displayed in the form of icons. For example, the location of a smartphone corresponding to the first item 710 may be displayed on the map together with the first icon 732. In addition, the location of a tablet corresponding to the second item 720 selected by the user input 700 may be displayed on the map together with the second icon 731. In an embodiment, the location of the tablet corresponding to the second item 720 selected by the user input 700 may be located in the center of the map area 730. In addition, a current location 740 of the first device 201 may be displayed on the map area 730. In an embodiment, the current location 740 of the first device 201 may be located in the center of the map area 730.

In an embodiment, the second device card area 750 may include a device action menu 751, a navigation menu 752, a ring menu 753, and/or a view details menu 754.

In an embodiment, when the device action menu 751 is selected, the first device 201 may determine whether the second device 202 (e.g., a tablet corresponding to the second item 720) is in the vicinity of the first device 201. For example, when the device action menu 751 is selected, the first device 201 may provide and/or update the map area 730 based on the location of the first device 201 and the location information of the user devices 200 received from the server 300. In addition, for example, in response to the fact that the device action menu 751 is selected, the first device 201 may search whether the second device 202 exists nearby using a designated communication protocol (e.g., BLE). When the first device 201 is connected to the second device 202 using the designated communication protocol, the first device 201 may drive the AR finder 233 and provide the location of the second device 202 through an AR interface, or may determine whether to provide the AR interface.

In an embodiment, when the navigation menu 752 is selected, the first device 201 may display a route to the confirmed location of the second device 202 on the map area 730. In an embodiment, when the ring menu 753 is selected, the first device 201 may also attempt to make a call to the second device 202 or to cause the second device 202 make a designated sound. For example, when the second device 202 supports a call function, the first device 201 may attempt to make a call to the second device 202 in response to the selection of the ring menu 753. As another example, when the second device 202 is connected to the first device 201 through a predetermined near field communication network, in response to the selection of the ring menu 753, the first device 201 may transmit a designated signal to the second device 202 through the near field communication network. Upon receiving the specified signal, the second device 202 may generate a predefined notification signal (e.g., alarm, vibration, and/or light emission) in response to the designated signal to notify its location.

In an embodiment, when the detailed view menu 754 is selected, the first device 201 may provide more detailed information about the second device 202. For example, the first device 201 may display the status of the second device 202 according to various conditions. For example, when the second device 202 is connected to the first device 201 or another device (e.g., the fifth device 205 or the sixth device 206) among the user devices 200, the first device 201 may display a first status message such as "Nearby Finding". The message may be displayed in a pop-up form or displayed in the second device card area 750 of the second device 202. In addition, when the second device 202 is not connected to the first device 201 or another device of the user devices 200 but is not in an "offline finding state", the first device 201 may display a second status message such as "Not in Range Finding". Here, "offline finding" state refers to a state in which the second device 202 is determined to be lost, and a state in which threshold time has elapsed since time when the second device 202 was last connected to any one of the user devices 200.

In an embodiment, when the second device 202 is not connected to the first device 201 or another of the user devices 200 and is not in the "offline finding" state, but there has been an attempt to find the second device 202, a third status message such as "Lost mode Finding" may be displayed. In addition, when the second device 202 is not connected to the first device 201 or another device of the user devices 200 and is in the "offline finding" state, the first device 201 may display a fourth status message such as "Update mode Finding". In addition, when the first device 201 attempts to connect to the second device 202, a fifth status message such as "connecting" may be displayed. In an embodiment, the first to fifth status messages related to the device action menu 751 may be included in the first device card 211 and/or the second device card 212 of FIG. 3.

The above-described first to fifth status messages are merely non-limiting examples, and fewer or more status messages may be appropriately configured by a manufacturer or a user according to various embodiments. For example, the first device 201 may provide remaining battery amount information of the second device 202. In addition, the first device 201 may display the location (location information) of the second device 202 based on a time stamp. In addition, the first device 201 may display the current status of the second device 202 using an appropriate message (device card message). For example, the first device 201 may display, on the display, messages indicating whether the second device 202 is located in the vicinity of the first device 201 or in the vicinity of another device (e.g., the fourth device 204) of the user devices 200, where the last location of the second device 202 is, whether the second device 202 is being searched for, or whether the second device 202 has been found.

In an embodiment, information presented in the second device card area 750 is not limited to the illustrated example, but may be provided together with at least one piece of information of information related to the device action menu 751 and information (e.g., remaining battery level, location information, and/or device card message) included in the detailed view menu 754.

Figure 8:
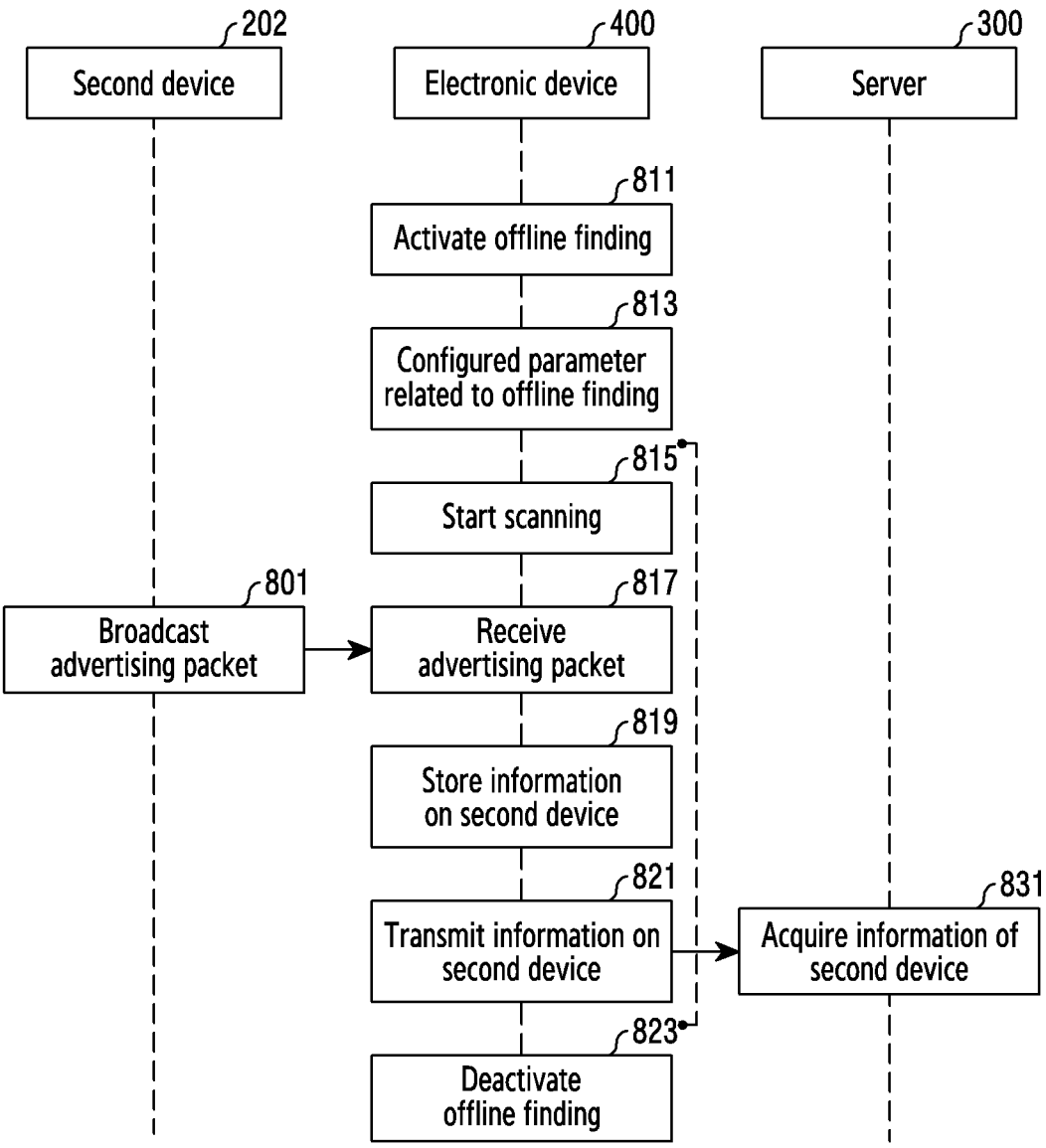
FIG. 8 is a signal flow diagram illustrating an example of performing scanning by an electronic device to find an arbitrary external device, according to various embodiments.

FIG. 8 is a signal flow diagram illustrating an example operation of performing scan by an electronic device to find an arbitrary external device, according various embodiments.

According to an embodiment, in operation 811, the electronic device 400 may activate offline finding. For example, the user of the electronic device 400 may activate an offline finding function in a configuration menu. For another example, the offline finding function may be periodically activated or may be always activated. As another example, the offline finding function may be activated only in a designated time period (e.g., 9:00 am to 6:00 pm).

According to an embodiment, in operation 813, the electronic device 400 may configure parameters related to the offline finding in response to the activation of the offline finding function. For example, parameters such as scan period and scan window, scan interval, scan holding time, and/or wakeup intent may be configured. Here, the scan period may refer to a time in which scanning is performed once. The scan window may refer to a time during which scanning is actually performed in the scan period. For example, when the scan period is 2000 ms and the scan window is 200 ms, a near field communication circuit may perform first scanning for 200 ms after wakeup, may maintain a sleep state for the remaining 1800 ms, and may then perform second scanning again for 200 ms when 2000 ms has elapsed after wakeup.

The scan holding time may refer to a time for maintaining the scan in the above-described scan period. For example, the electronic device 400 may maintain scanning performed every 2000 ms for one hour. The scan interval may refer to an interval between scan holding times. For example, when the scan holding time is one hour and the scan interval is 4 hours, the electronic device 400 may maintain the scanning for one hour from 00:00, may maintain the sleep state for 3 hours, and may then maintain the scanning for one hour again from 04:00 after 4 hours have elapsed from 00:00.

According to an embodiment, operation 813 may be omitted. When operation 813 is omitted, a designated configuration value (e.g., a default value) may be used for configuring parameters related to offline finding.

According to an embodiment, in operation 815, the electronic device 400 may start scanning. The scanning of the electronic device 400 may be performed according to a rule defined by the scan-related parameters configured in operation 813. The electronic device 400 may activate a first communication circuit supporting near field communication to acquire an advertising packet obtained from an external device (e.g., the second device 202) while scanning is performed.

According to an embodiment, the second device 202 may broadcast an advertising packet using a near field communication protocol designated in operation 801. For example, the second device 202 may broadcast an advertising packet including identification information and country code of the second device 202, and/or a multi-hop count at certain time intervals using a BLE protocol.

In an embodiment, the second device 202 may broadcast the advertising packet according to a change in a network state. For example, the second device 202 may determine whether the current network is available. For example, when a network connection between the second device 202 and the server 300 or the first device 201 is lost, the second device 202 may determine whether the loss of the network connection occurs due to an airplane mode. In order for an application of the second device 202 to confirm the current network state, the corresponding application (e.g., an application providing a location finding service) may reside in the memory of the second device 202. In an embodiment, when the loss of the network connection does not occur due to the airplane mode, the second device 202 may configure an alarm and may broadcast the advertising packet when the configured alarm time arrives. Thereafter, when the network is restored again (e.g., the connection with the first device 201 is restored), the second device 202 may cancel the configured alarm and may stop broadcasting the advertising packet.

According to an embodiment, after the scanning starts, in operation 817, the electronic device 400 may receive the advertising packet from an external device, for example, the second device 202 which was broadcast by the second device 202 in operation 801. In operation 817, the electronic device 400 may obtain information on the second device 202 from information included in the received advertising packet, and may store the information obtained in operation 819 in the memory of the electronic device 400.

According to an embodiment, in operation 821, the electronic device 400 may transmit the information on the second device 202 to the server 300 based on the information (e.g., country code) received from the second device 202. The electronic device 400 may include information on the second device 202 and location information of the second device 202. Here, the location information may be the location of the electronic device 400 measured by the location measuring circuit of the electronic device 400. In addition, the electronic device 400 may obtain an encryption key for encrypting information transmitted to the server 300, from the server 300 in order to improve security, may encrypt the information on the second device 202 with the obtained encryption key, and may transmit the encrypted information to the server 300. For example, the electronic device 400 may transmit at least a portion of the information on the second device 202 to the server 300, may obtain an encryption key from the server 300, and may then encrypt information and/or location information of the second device 202 using the obtained encryption key to transmit the encrypted information to the server 300.

According to an embodiment, in operation 831, the server 300 may obtain (e.g., acquire) the information and/or location information of the second device 202 from the electronic device 300, and may provide information about the location of the second device 202 to the first device 201 in response to a request from the first device (e.g., operation 623 of FIG. 6).

In an embodiment, the electronic device 400 may repeat operations 815, 817, 819, and/or 821 for a predetermined time, for example, a scan holding time, and may deactivate an offline finding function in operation 823 when the scan holding time ends. However, in an embodiment, the offline finding function may be deactivated by various events such as a user input or the remaining battery level of the electronic device 400.

Figure 9:
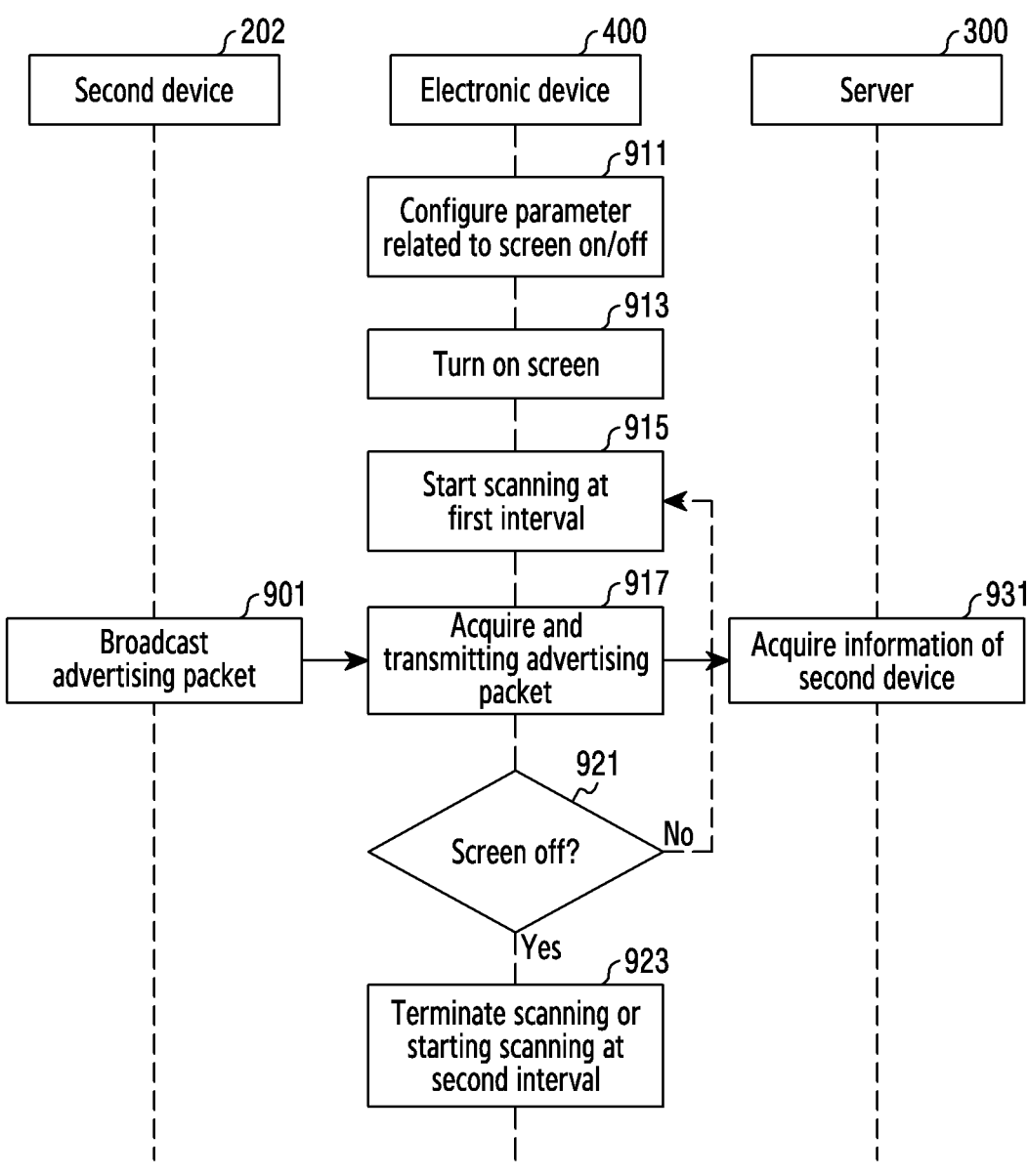
FIG. 9 is a signal flow diagram illustrating an example of adjusting a scan interval according to ON/OFF of a screen of an electronic device according to various embodiments.

FIG. 9 is a signal flow diagram illustrating an example operation of adjusting a scan interval according to ON/OFF of a screen of an electronic device according to various embodiments.

Referring to FIG. 9, in operation 911, the electronic device 400 may configure a parameter related to screen ON/OFF. For example, the electronic device 400 may configure parameters related to the offline finding function in response to the activation of the offline finding function in operation 813 of FIG. 8. Some parameters may be configured differently depending on whether the screen (display) of the electronic device 400 is in an ON state or an OFF state. For example, the electronic device 400 may perform scanning in a first period (e.g., 1000 ms) in a screen ON state, but may perform scanning in a second period (e.g., one hour) in a screen OFF state. For another example, the electronic device 400 may perform scanning on a scan window by a first length (e.g., 200 ms) in the screen ON state, but may perform scanning on the scan window by a second length (e.g., 100 ms) in the screen OFF state.

According to an embodiment, in operation 913, the screen of the electronic device 400 may be turned on. When the screen of the electronic device 400 is switched to the ON state, in operation 915, the electronic device 400 may start scanning on the advertising packet broadcasted from an external device at a first interval.

According to an embodiment, in operation 901, the second device 202 may continuously broadcast the advertising packet using a designated near field communication protocol as in operation 801 of FIG. 8. While performing scanning at the first interval, the electronic device 400 may obtain the advertising packet from the external device, for example, the second device 202 in operation 917, and may transmit the information and/or location information of the second device 202 obtained through the advertising packet to the server 300.

According to an embodiment, in operation 931, the server 300 may acquire the information and/or location information of the second device 202 from the electronic device 400, and may provide the information about the location of the second device 202 to the first device 201 in response to the request from the first device 201 (e.g., operation 623 of FIG. 6).

According to an embodiment, in operation 921, the electronic device 400 may determine whether the screen of the electronic device 400 is turned off. When the screen of the electronic device 400 is not turned off (e.g., the ON state is maintained), the electronic device 400 may continuously perform a scanning operation at the first interval. When the screen of the electronic device 400 is turned off, in operation 923, the electronic device 400 may terminate the scanning or may perform scanning at a second interval configured longer than the first interval.

Figure 10:
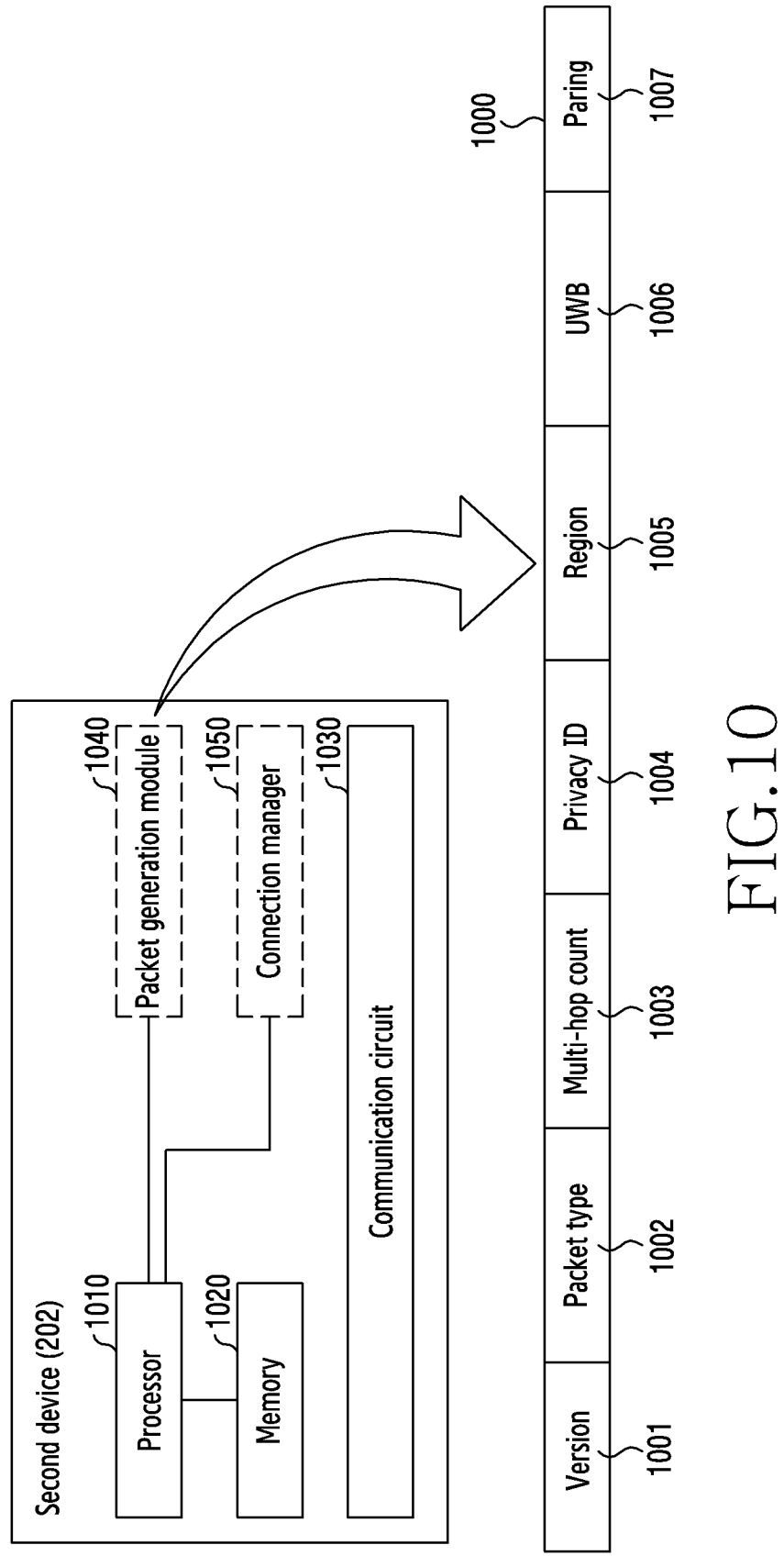
FIG. 10 is a diagram illustrating an example configuration of a second device and a data structure of a packet broadcasted by the second device according to various embodiments.

FIG. 10 is a diagram illustrating an example configuration of a second device and a data structure of a packet broadcasted by the second device according to various embodiments.

Referring to FIG. 10, the second device 202 may include a processor (e.g., including processing circuitry) 1010, a memory 1020, and a communication circuit 1030. The components of the second device 202 shown in FIG. 10 are merely examples, and the components described with reference to FIG. 1 may be appropriately applied to the second device 202. In addition, the description of FIG. 1 may be applied to the components corresponding to FIG. 1 among the components of FIG. 10.

In an embodiment, the processor 1010 may include various processing circuitry and execute instructions from the memory 1020 and may implement a packet generation module 1040 and/or a connection manager 1050 (each of these modules may, for example, include various executable program instructions executed by the processor). The packet generation module 1040 and the connection manager 1050 may be understood as software modules implemented by executing program codes stored in the memory 1020. In addition, in the following description, an operation described as being performed by the packet generation module 1040 or the connection manager 1050 may be understood as being performed by the processor 1010.

Referring to FIG. 10, the processor 1010 may drive the packet generation module 1040 by executing instructions stored in the memory 1020. The packet generation module 1040 may generate an advertising packet 1000 including information on the second device 202. The processor 1010 may provide the generated advertising packet 1000 to the communication circuit 1030 via (using) the connection manager 1050, and the communication circuit 1030 may use a designated protocol to broadcast the advertising packet 1000.

In an embodiment, the advertising packet 1000 may include a version 1001, a packet type 1002, a multi-hop count 1003, a privacy ID 1004, a region 1005, a UWB 1006, and/or a pairing field 1007.

In an embodiment, the version 1001 may refer to a version of the advertising packet. Since the advertising packet must be based on a rule shared between the second device 202 broadcasting the advertising packet and the electronic device 400 that receives and interprets the advertising packet, the version of the advertising packet may be used to determine a rule for interpreting data included in the advertising packet by the electronic device 400 that has received the advertising packet. For example, when receiving an advertising packet of an older version instead of the latest version, the electronic device 400 may interpret the advertising packet according to a rule corresponding to the older version. As another example, when the version of the electronic device 400 is lower than the version of the advertising packet, the electronic device 400 may update the version through a server (e.g., the server 108 of FIG. 1).

In an embodiment, the packet type 1002 may indicate whether the corresponding packet is a packet supporting multi-hop for the advertising packet. Additionally, and/or alternatively, the packet type 1002 may indicate information on whether the second device 202 is currently in an offline mode (e.g., offline finding) or an online mode.

In an embodiment, the multi-hop count 1003 may indicate how many times the advertising packet was propagated. For example, when the advertising packet is directly broadcasted from the second device 202, the multi-hop count of the advertising packet may be defined as 0. When another device receiving the advertising packet from the second device 202 broadcasts the advertising packet again, the multi-hop count of the advertising packet broadcasted again may be defined as 1 or more.

In an embodiment, the privacy ID 1004 may be unique identification information of the second device 202. Additionally, and/or alternatively, the privacy ID 1004 may be a random ID generated according to a predetermined algorithm based on the unique identification information of the second device 202.

In an embodiment, the region 1005 may include country information of the second device 202. For example, the region 1005 may be information through which it is possible to know country information and/or the address of the server 300 received from the server 300 when the second device 202 is onboard. For example, the region 1005 may be information related to data included in the country code matching module 242 of FIG. 3 or the country code-server matching DB 330 of FIG. 4.

In an embodiment, the UWB 1006 may indicate whether the second device 202 is a device that supports UWB communication. The advertising packet 1000 may further include information on whether the second device 202 supports E2E or MCF in addition to UWB.

In an embodiment, the pairing 1007 may include information on whether the second device 202 operates alone, whether the second devices operate as a pair, such as earbuds, or whether the second devices are paired with each other when the second devices operate as a pair.

Figure 11:
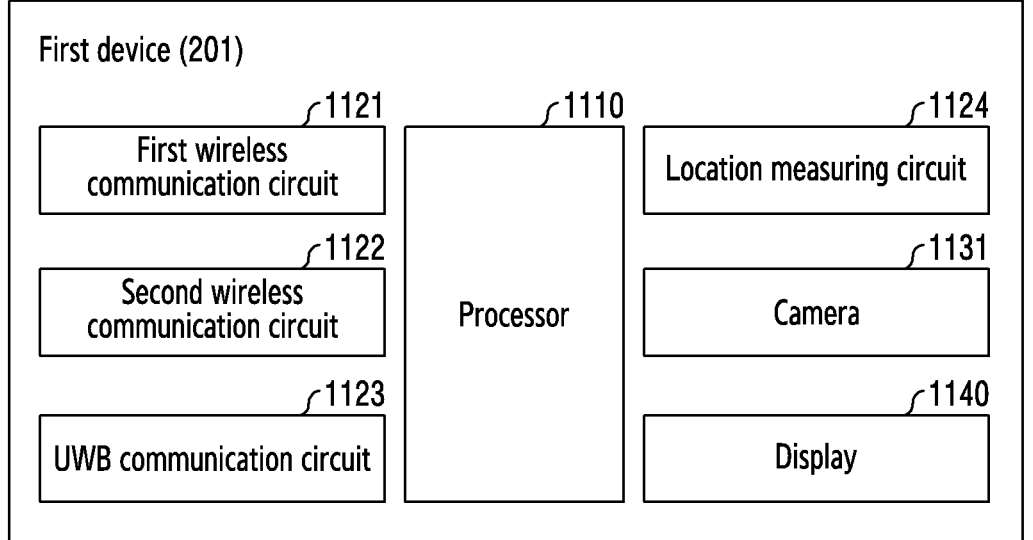
FIG. 11 is a block diagram illustrating an example configuration of a first device according to various embodiments.

FIG. 11 is a block diagram illustrating an example configuration of a first device according to various embodiments.

Referring to FIG. 11, the first device 201 may include a first wireless communication circuit 1121, a second wireless communication circuit 1122, a UWB communication circuit 1123, a location measuring circuit 1124, a camera 1131, a display 1140, and at least one processor (e.g., including processing circuitry) 1110 electrically or operatively connected thereto. The first device 201 of FIG. 11 may be understood as a device that obtains coordinate information of the lost second device 202 from the server 300, moves to the vicinity of the coordinates, and performs near field connection and UWB communication with respect to the second device 202. For example, the first device 201 may be a device that registers the second device 202 in the server 300 based on a first user account, or a device that is registered in the server 300 based on the same first user account.

In various embodiments, descriptions of the electronic device 101 of FIG. 1 and the first device 201 of FIG. 2 may be applied to the first device 201 described with reference to FIGS. 11, 12, 13, 14, 15, 16 and 17. For example, the processor 1110 of the first device 201 may correspond to the processor 120 of FIG. 1. In addition, the camera 1131 of the first device 201 may correspond to the camera module 180 of FIG. 1. The first wireless communication circuit 1121, the second wireless communication circuit 1122, the UWB communication circuit 1123, and the location measuring circuit 1124 of the first device 201 may correspond to the communication module 190 or the wireless communication module 192 of FIG. 1. In addition, the description of the electronic device 101 of FIG. 1 may be appropriately applied to the first device 201.

In an embodiment, the first wireless communication circuit 1121 may support near field communication. For example, the first wireless communication circuit 1121 may support BLE and/or BT communication. When the first device 201 approaches within a range capable of near field communication with the second device 202, the first device 201 may establish a near field communication channel using the first wireless communication circuit 1121.

In an embodiment, the second wireless communication circuit 1122 may communicate with the server 300. The first device 201 may obtain location information of the second device 202 reported to the server 300 through a cellular network or a Wi-Fi network using the second wireless communication circuit 1122.

In an embodiment, the UWB communication circuit 1123 may perform communication using a signal in a frequency band of about 3 to 10.6 GHz using an antenna. For example, the UWB communication circuit 1123 may be electrically connected to a plurality of antennas, and the plurality of antennas may include a patch antenna, a dipole antenna, or an antenna using a part of a housing (not shown) of the first device 201. The UWB communication circuit 1123 may measure a distance and a direction between a target object and the first device 201 by measuring an angle of arrival (AOA) of a signal through the plurality of antennas. The UWB communication circuit 1123 may generate and provide positioning information in the form of a UWB ranging data format, wherein the UWB ranging data may include, for example, a first aoaFirst (AOA), a second aoaSecond (AOA), a distance, a device ID, and/or Bluetooth (BT) information. Here, the first AOA may refer to the angle of the target object with respect to the horizontal axis (or width direction) of the electronic device, and the second AOA may refer to the angle of the target object with respect to the vertical axis (or length direction) of the electronic device. The first AOA may be referred to as aoaPortrait, and the second AOA may be referred to as aoaLandscape.

In an embodiment, the location measuring circuit 1124 may include a GPS. In addition, the camera 1131 may generally be a rear camera disposed on the rear side of the first device 201, but is not limited thereto. For example, the camera 1131 may include a front camera, or a suitable optical sensor (e.g., an IR camera).

In an embodiment, the display 1140 may visually provide corresponding information to the outside (e.g., a user) of the first device 201. The display 1140 may include, for example, a display, a hologram device, a projector, or the like, and a control circuit for controlling the corresponding device. According to an embodiment, the display 1140 may include a touch sensor configured to sense a touch or a pressure sensor configured to measure the intensity of a force generated by the touch. In an embodiment, the display 1140 may be rollable or foldable. In various embodiments, when the first device 201 is an AR glasses device, the first device 201 may include glasses, and the display 1140 may be positioned on at least a portion of the glasses, and at least a portion of the display 1140 may include a transparent material.

Figure 12:
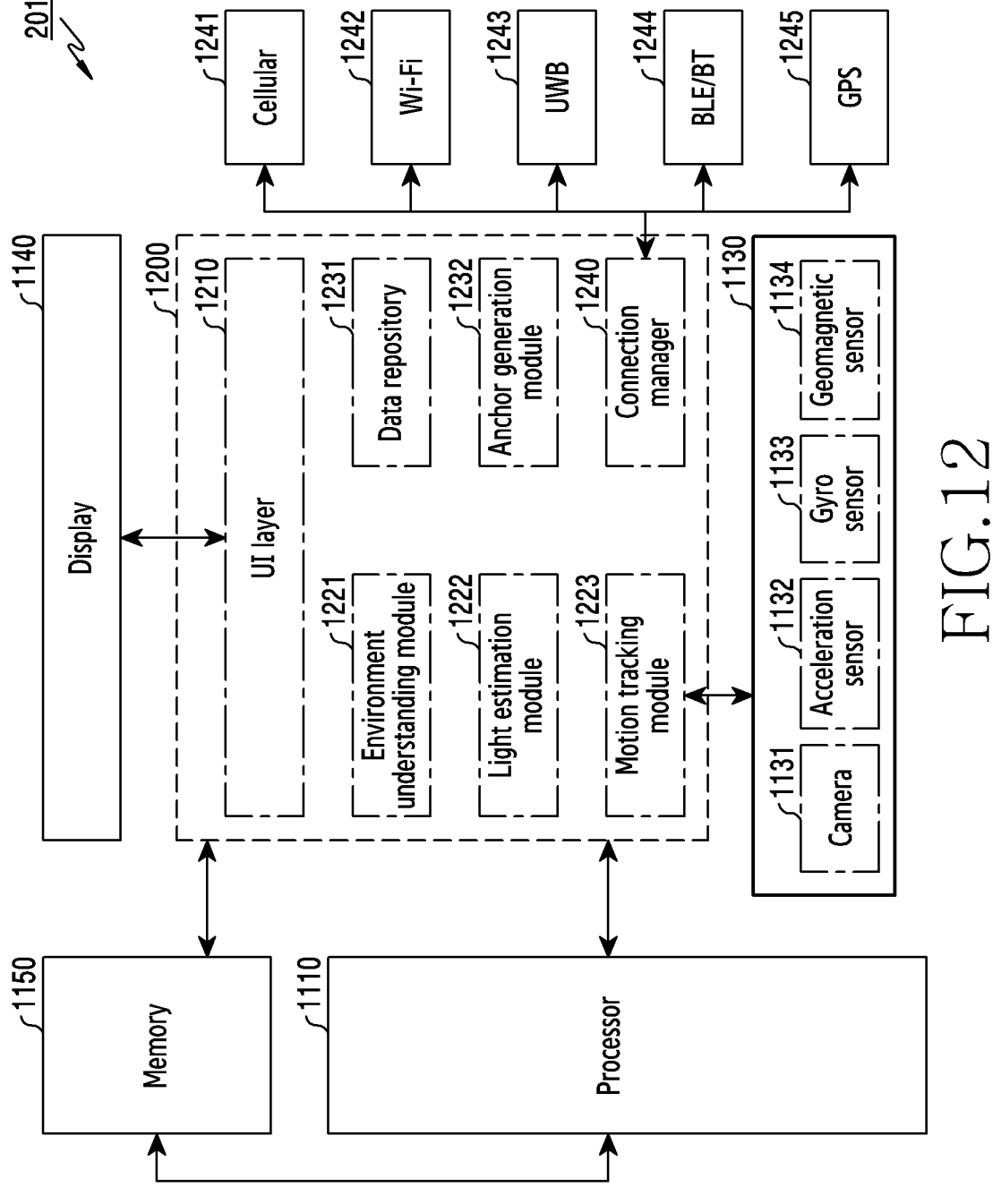
FIG. 12 is a diagram illustrating various example modules related to hardware components of a first device and various functions implemented through the hardware components according to various embodiments.

FIG. 12 is a diagram illustrating various example modules related to components of a first device and various functions implemented through the components according to various embodiments.

The first device 201 according to an embodiment may include a processor (e.g., including processing circuitry) 1110, one or more sensors 1130, a display 1140, a memory 1150, a cellular circuit 1241, a Wi-Fi circuit 1242, a UWB circuit 1243 (e.g., the UWB communication circuit 1123 of FIG. 11), a BLE/BT circuit 1244, and/or a GPS circuit 1245.

Referring to FIG. 12, the processor 1110 may implement a location guidance service 1200 by executing a program code stored in the memory 1150. For example, the location guidance service 1200 may be implemented as software (e.g., the program 140) including one or more instructions stored in the memory 1150. The location guidance service 1200 may be understood to be performed using the processor 1110 and other suitable hardware.

The location guidance service 1200 according to an embodiment may include a UI layer 1210, an environment understanding module 1221, a light estimation module 1222, a motion tracking module 1223, a data repository 1231, an anchor generation module 1232, and/or a connection manager 1240.

Referring to FIGS. 3 and 12, the location guidance service 1200 may be implemented through a finding platform 230, a BT finder 231, a UWB finder 232, an AR finder 122, and/or an AR core service 240. For example, the finding platform 230 may configure the UI layer 1210 and may provide a UI through the display 1140. In addition, a user input obtained through the UI of the display 1140 may be provided to an appropriate module. The BT finder 231 and the UWB finder 232 may control an appropriate communication circuit through the connection manager 1240. For example, the BT finder 231 may control the BLE/BT circuit 1244, and the UWB finder 232 may control the UWB circuit 1243.

In an embodiment, the one or more sensors 1130 may include a camera 1131, an acceleration sensor 1132, a gyro sensor 1133, and/or a geomagnetic sensor 1134.

In an embodiment, the AR core service 240 may include the environment understanding module 1221, the light estimation module 1222, and/or the motion tracking module 1223.

In an embodiment, the environment understanding module 1221 may detect a horizontal plane by analyzing feature points of the surrounding environment, such as a floor or a table. For example, the environment understanding module 1221 may activate the camera 1131 and may capture a surrounding image for feature point analysis.

In an embodiment, the light estimation module 1222 may implement a virtual object more realistically by observing ambient lighting and adding an appropriate lighting effect to the virtual object generated in an AR interface. For example, the light estimation module 1222 may detect and analyze ambient lighting using an illuminance sensor and/or the camera 1131.

In an embodiment, the motion tracking module 1223 may use the one or more sensors 1130 to determine the pose of the first device 201 such as the location and direction of the first device 201 according to the movement of the first device 201. In this disclosure, the pose may be referred to as being obtained by transforming an object in a local coordinate space into a standard coordinate space (or a world coordinate space). That is, even if the first device 201 moves in the local coordinate space, a consistent environment can be maintained by adjusting the first device to the standard coordinate space.

In an embodiment, the motion tracking module 1223 may determine the pose of the first device 201 using at least one of the camera 1131, the acceleration sensor 1132, the gyro sensor 1133, and/or the geomagnetic sensor 1134. The motion tracking module 1223 may use the camera 1131 to analyze feature points in the surrounding space. In addition, the acceleration sensor 1132 and the gyro sensor 1133 may be referred to as an inertial measurement unit (IMU).

In an embodiment, the AR finder 233 may include the data repository 1231 and the anchor generation module 1232. The AR finder 233 may determine a temp point and a target point at the time of receiving a UWB signal and/or a BT signal based on signals obtained from the BT finder 231 and the UWB finder 232. Thereafter, the AR finder 233 may provide AR generated based on the target point to the display 1140 as the AR interface. When the UWB signal is not received temporarily/continuously, the AR finder 233 may update the AR interface based on the temp point.

In an embodiment, the data repository 1231 may perform a function of appropriately storing and processing various types of data before the AR interface is provided to the display 1140 through the UI layer 1210. For example, the data repository 1231 may remove data having a deviation greater than or equal to a designated range among data collected for a certain period, or may perform a normalization or smoothing operation.

In an embodiment, the anchor generation module 1232 may generate an anchor corresponding to a lost device (e.g., the second device 202) based on the obtained UWB signal (e.g., UWB range data). The anchor generation module 1232 may configure so that the first device 201 or the camera 1131 of the first device 201 and the coordinates of the anchor can maintain an appropriate relative position with the actual position. For example, the anchor generation module 1232 may configure an anchor in the standard coordinate space based on the obtained UWB signal and the posture of the first device 201, and may calculate a distance and direction information between the first device 201 and the second device 202. In addition, the anchor generation module 1232 may update the distance and direction information between the first device 201 and the second device 202 based on information obtained through the one or more sensors 1130.

However, the classification of the software modules described in this disclosure are merely examples, and appropriate modifications are possible. For example, the AR finder 233 may include even the function of the AR core service 240. In addition, the connection relationship indicated by the arrow in FIG. 12 is merely an example and does not limit the connection between hardware/software. For example, although not shown in FIG. 12, the processor 1110 and the display 1140 may be electrically and/or operatively connected to each other directly through a predetermined interface.

Figure 13:
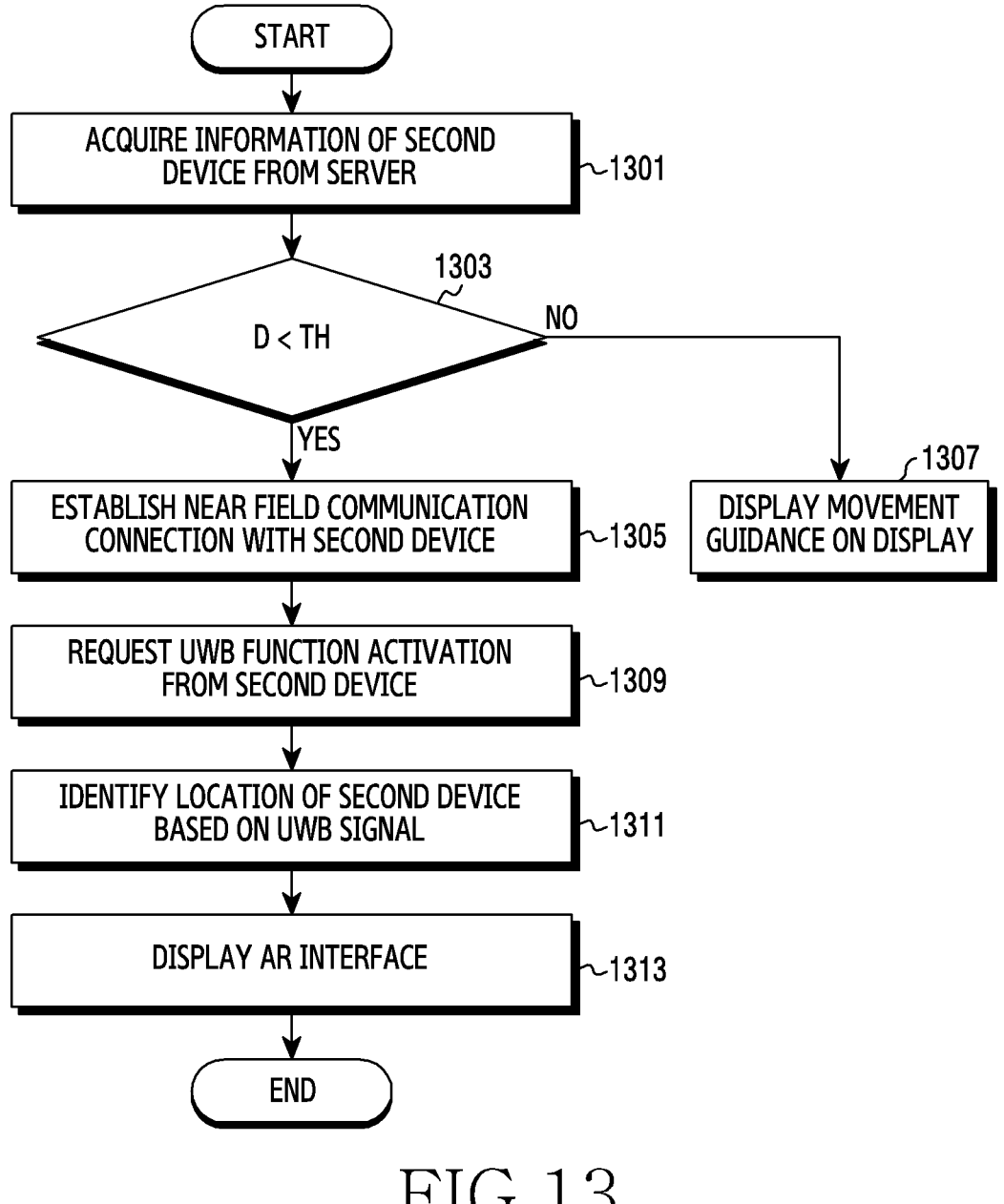
FIG. 13 is a flowchart illustrating an example operation of providing guidance for finding a lost device according to various embodiments.

FIG. 13 is a flowchart illustrating an example operation of providing guidance for finding a lost device according to various embodiments.

Referring to FIG. 13, in operation 1301, the first device 201 may obtain (e.g., acquire) information on a lost (e.g., second) device from the server 300. For convenience of description, it is assumed that the lost device is the second device 202 among the user devices 200 sharing the same user account with the first device 201. In an embodiment, the first device 201 may obtain information about the second device 202 that is registered in the first device 201 with the user account of the first device 201 but is not currently connected to the first device 201, from the server 300 using the second wireless communication circuit 1122.

In an embodiment, operation 1301 may be performed automatically when the user executes an application that provides a location guidance service, or may be performed when the user provides an input requesting location information through a predetermined interface. For example, the first device 201 may transmit an information request for the second device 202 to the server 300, and may receive information on the second device 202 from the server 300.

In an embodiment, the information on the second device 202 may include information on the coordinates of the second device 202. The coordinates of the second device 202 may refer to GPS location information of a device that has received an advertising packet from the second device 202 measured by another device (e.g., the electronic device 400). In addition, the information on the second device 202 may further include information on whether the second device 202 supports UWB communication (e.g., whether the second device 202 includes a UWB antenna and a UWB communication circuit), the remaining battery level of the second device 202, and/or information on whether to support the UWB communication according to the remaining battery level of the second device 202.

According to an embodiment, in operation 1303, the first device 201 may determine whether the first device 201 exists within a designated or specified distance (e.g., whether the distance D is less than a specified threshold TH) from coordinates of the second device 202 based on the information on the second device 202 obtained from the server 300 and the location of the first device 201 measured by the location measuring circuit 1124. For example, the first device 201 may determine whether a distance D between the current location of the first device 201 and the coordinates of the second device 202 is less than a threshold distance TH. For example, the user of the first device 201 may move to the location of the second device 202 based on the information on the second device 202 obtained from the server 300, and may determine whether the distance D between the current location of the first device 201 and the coordinates of the second device 202 is less than the threshold distance TH, through the location measuring circuit 1245 or the GPS circuit 1245.

In response to the determination in operation 1303, the first device 201 may determine whether to attempt a near field communication connection with the second device 202 or to guide the movement in the direction in which the second device 202 is located. For example, when the distance D between the current location of the first device 201 and the coordinates of the second device 202 is less than the threshold distance TH (e.g., a first distance), in operation 1305, the first device 201 may establish a near field communication connection using the second device 202 and the first wireless communication circuit 1121. The near field communication connection may, for example, be a Bluetooth communication channel. As another example, when the distance D between the current location of the first device 201 and the coordinates of the second device 202 is greater than or equal to the threshold distance TH, in operation 1307, the first device 201 may display a movement guidance instructing to get closer to the second device 202 on the display 1140.

According to an embodiment, when the near field communication connection with the second device 202 is established, in operation 1309, the first device 201 may transmit a request for activating the UWB function of the second device 202, to the second device 202 through the near field communication connection. The request may be performed immediately when the near field communication connection is established, or may be performed after the first device 201 approaches within a range (e.g., a second distance) in which UWB communication is possible even though the near field communication connect is established. For example, the range in which UWB communication is possible (e.g., the second distance) may be smaller than the threshold distance TH (e.g., the first distance). In addition, once the near field communication connection is established, the first device may periodically transmit the request until it is determined whether UWB communication is possible.

In an embodiment, operation 1309 may be performed when the information on the second device 202 obtained by the first device 201 from the server 300 includes the content that the second device 202 can currently support UWB. For example, the content that the second device 202 obtained from the server 300 can currently support UWB may include information on whether the second device supports UWB communication and/or whether the second device has the remaining battery level in which the second device can perform UWB communication. However, the disclosure is not limited thereto, and operation 1309 may be performed even when the information on the second device 202 obtained by the first device 201 from the server 300 does not contain UWB related information, or even when the information on the second device 202 does not include the content that the second device 202 does not support UBW. In addition, the information on whether the second device 202 supports UWB may be provided from the second device 202 while the near field communication connection is performed. Alternatively, the information on whether the second device 202 supports UWB may be provided in an appropriate process (e.g., operation 503 or operation 515) among the onboarding procedures described with reference to FIG. 5.

In an embodiment, the second device 202 having received a UWB activation request through the established near field communication connection with the first device 201 may activate the UWB communication function of the second device 202 in response to the UWB activation request. For example, when the near field communication connection is established with the first device 201 through a wireless communication circuit, the second device 202 activate the UWB communication circuit included in the second device 202 in response to the UWB activation request received from the first device 201. In an embodiment, the second device 202 may transmit a UWB signal in a channel (frequency) and period (e.g., 100 ms) configured by the UWB activation request using a UWB communication circuit and a UWB antenna connected to the UWB communication circuit. In various embodiments, among the components described as being included in the first device 201, the description provided with reference to the first device 201 may be applied to components included even in the second device 202.

In an embodiment, when receiving a response indicating that activation of the UWB function is not possible from the second device 202 in response to the request for activating the UWB function, the first device 201 may estimate a distance to the second device 202 using another communication function instead of the UWB function. For example, the first device 201 may determine the strength of a signal (e.g., the strength of the Bluetooth signal) detected using the first wireless communication circuit 112, and may guide the movement in a direction in which the strength of the signal increases. In addition, the first device 201 may show an approximate distance according to the signal strength using a predetermined look-up table.

According to an embodiment, in operation 1311, the first device 201 may identify the location of the second device 202 with respect to the first device 201 based on the UWB signal received from the second device 202. For example, the first device 201 may identify a direction in which the second device 202 is located and a distance to the second device 202.

According to an embodiment, in operation 1313, the first device 201 may output an AR interface through the display 1140. For example, the first device 201 may acquire peripheral image data of the first device 201 using the camera 1131, may generate an AR interface based on the acquired image data and the identified location of the second device 202, and may output the generated AR interface to the display 1140. Example UIs related thereto are described with reference to FIG. 14.

Figure 14:
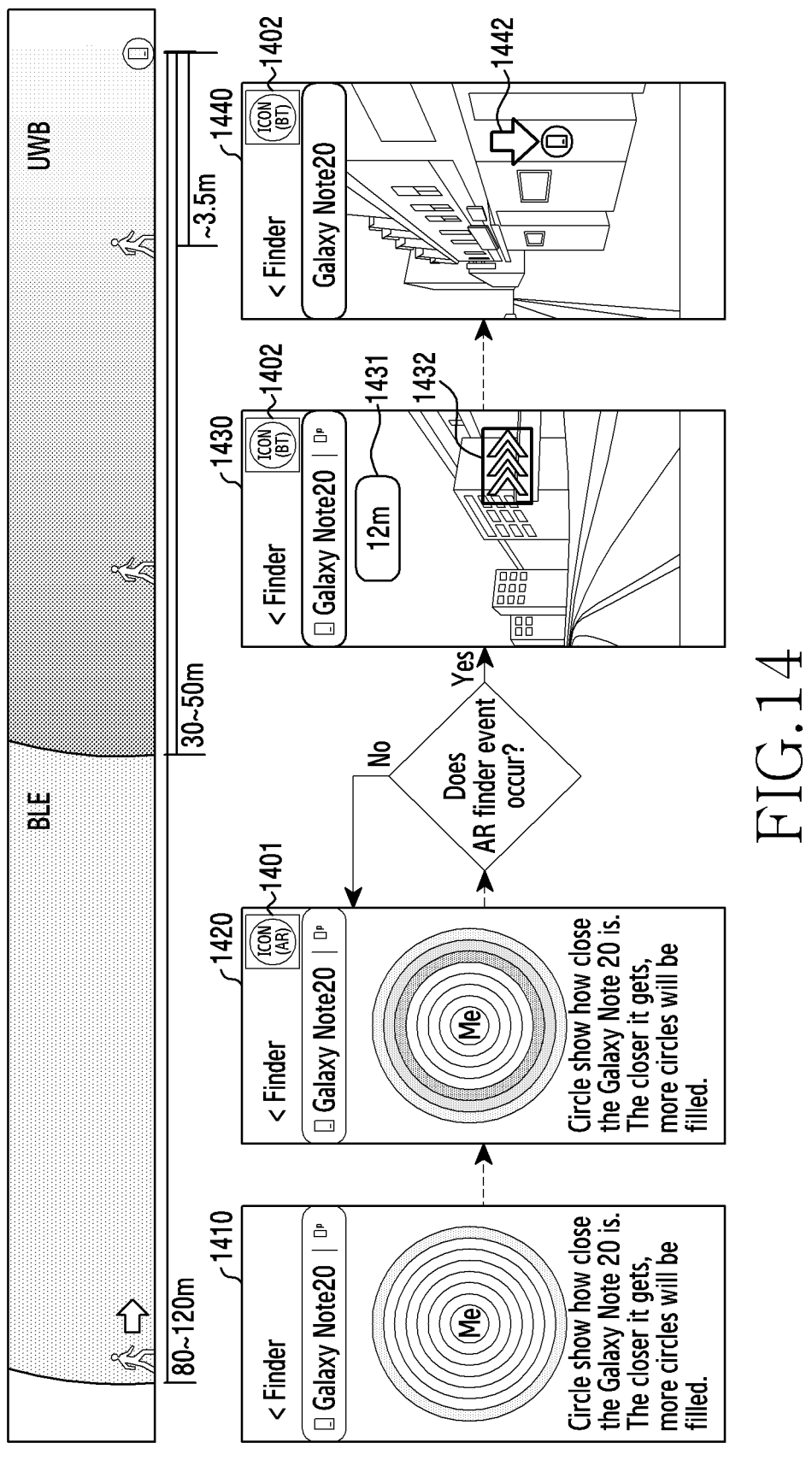
FIG. 14 is a diagram illustrating example UIs provided by an electronic device according to a distance according to various embodiments.

FIG. 14 is a diagram illustrating various example UIs provided by an electronic device according to a distance according to various embodiments.

Referring to FIG. 14, when an application providing a location guidance service is executed, the first device 201 may provide a guidance screen such as a first screen 1410. For example, the first device 201 may executes the location guidance service to find the second device 202 (e.g., Galaxy Note 20), and may provide a UI form in which a circle is filled with a predetermined color from the outside to the inside according to the signal strength with the second device 202. For example, when the first device 201 approaches the second device 202 while the first screen 1410 is displayed, the second screen 1420 may be displayed. While the first screen 1410 and the second screen 1420 are displayed, the BT finder 231 may operate.

In an embodiment, when a predefined AR finder execution event occurs, the first device 201 may switch the guidance screen from the first screen 1401 or the second screen 1420 to a third screen 1430 or a fourth screen 1440.

For example, the second screen 1420 may include a first icon 1401 for switching to the AR interface. In response to a user's selection of the first icon 1401, the second screen 1420 may be switched to the third screen 1430 providing the AR interface. In this case, a user input for selecting the first icon 1401 may correspond to the AR finder execution event. Similarly, the third screen 1430 may include a second icon 1402 for switching the AR interface to the BT interface. For example, when the second screen 1420 is switched to the third screen 1430, the first icon 1401 displayed on the second screen 1420 may be changed to the second icon 1402 at the same location and may be displayed. In response to the user selection of the second icon 1402, the third screen 1430 may be switched back to the second screen 1420 providing a BT interface.

In an embodiment, the second screen 1420 may be automatically switched to the third screen 1430. For example, in response to the fact that the first device 201 is located within a specified distance from the coordinates of the second device 202 and a near field communication connection is established between the first device 201 and the second device 202, the first device 201 may switch the interface from the second screen 1420 to the third screen 1430. In this case, the fact that the first device 201 is located within the specified distance from the coordinates of the second device 202 and the near field communication connection with the second device 202 is established may correspond to the AR finder execution event. As another example, in response to the near field communication connection being established between the first device 201 and the second device 202 and the second device 202 activates a UWB, the corresponding interface may be switched from the second screen 1420 to the third screen 1430. In this case, the reception of the response to the UWB activation from the second device 202 may correspond to the AR finder execution event. As another example, based on the fact that the user detects the movement of the first device 201 by a designated range or more using the acceleration sensor 1132, the gyro sensor 1133, and/or the geomagnetic sensor 1134, the interface may be switched from the second screen 1420 to the third screen 1430.

In an embodiment, the third screen 1430 may be an AR interface output in operation 1313. In addition to the second icon 1402 described above, the third screen 1430 may include a first object 1431 indicating a distance from the current location of the first device 201 to the location of the second device 202 identified based on the UWB signal. In addition, in a coordinate space determined based on the pose of the first device 201, a second object 1432 pointing to a location corresponding to the second device 202 may be included. Here, the location corresponding to the second device 202 may correspond to the location of an anchor generated by the anchor generating module 1232. In addition, the second object 1432 may be an object indicating a direction, such as an arrow for indicating a direction toward the anchor. The second object 1432 may indicate that the second device 202 is currently located outside a frame captured by the camera 1131 of the first device 201, or located inside the frame, but not in close proximity enough.

In an embodiment, when it is determined that the first device 201 is in close proximity (e.g., within 3.5 m) of the second device 202 and the second device 202 is located within a frame captured by the camera 1131 of the first device 201, the first device 201 may output the fourth screen 1440 to the display 1140. In an embodiment, the fourth screen 1440 may display an arrow 1442 pointing to the object together with the object representing the second device 202 on the AR interface.

Figure 15:
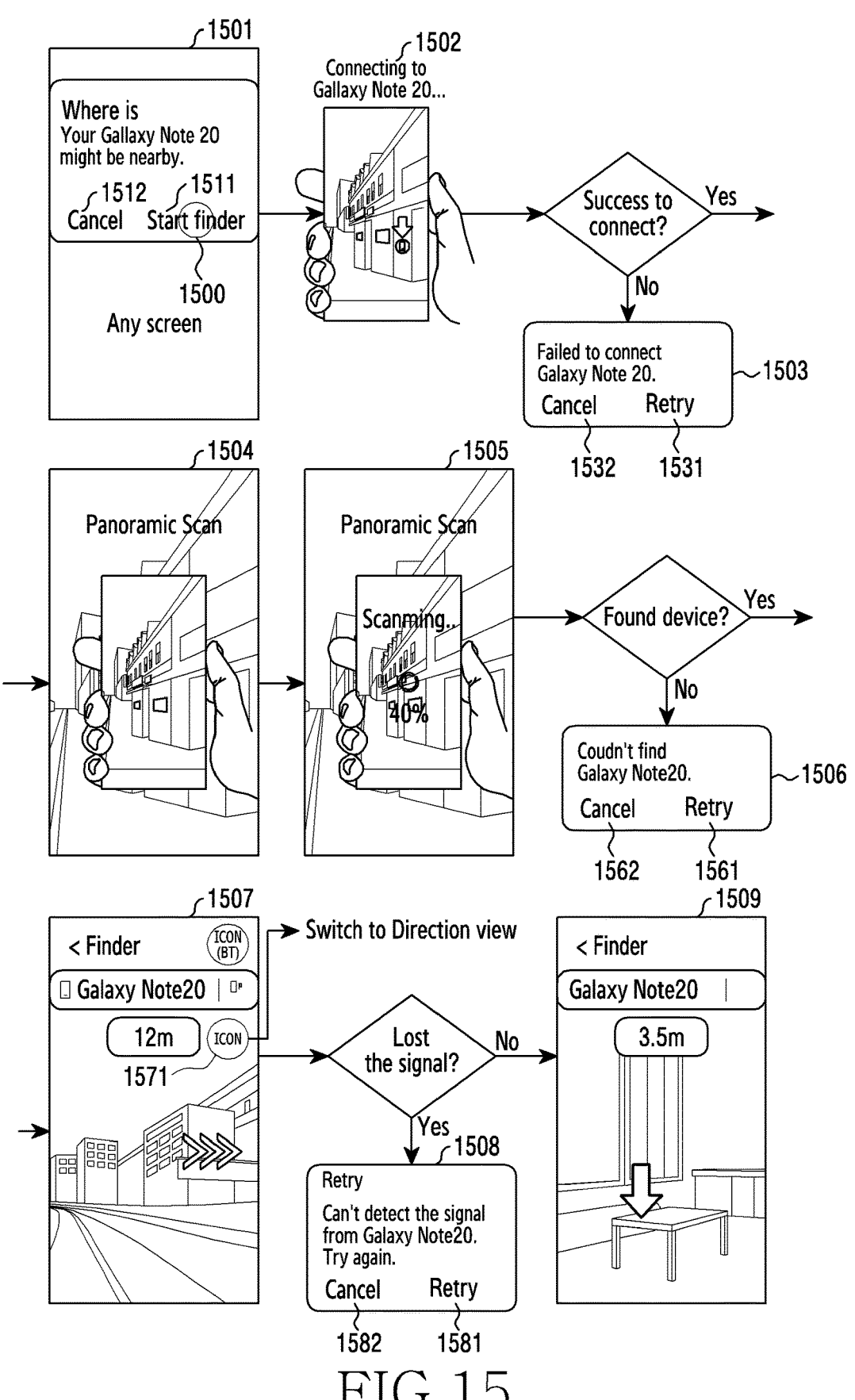
FIG. 15 is a diagram illustrating example UIs provided by an electronic device using augmented reality (AR) according to various embodiments.

FIG. 15 is a diagram illustrating various example UIs provided by an electronic device using augmented reality (AR) according to various embodiments.

Referring to FIG. 15, when the first device 201 is close to the second device 202 within a reference distance, a first UI 1501 may be provided. For example, when the first device 201 is close to the second device 202 within the reference distance (e.g., 30 m or 50 m) in a state in which the first screen 1410 or the second screen 1420 of FIG. 14 or another arbitrary screen is output to the display 1140, a menu asking whether to execute the corresponding finder in the form of pop-up may be displayed together with a message (e.g., Your Galaxy Note 20 might be nearby) indicating that the second device 202 is located nearby.

In an embodiment, the first device 201 may attempt to communicate with the second device 202 in response to a user input 1500 executing the finder. The communication attempt may be a process of establishing a near field communication connection using Bluetooth. Establishing the near field communication connection may take several seconds depending on the distance and/or signal strength between the first device 201 and the second device 202, and a second UI 1502 may be provided during the establishment. Operations 1305 and 1309 may be performed while the second UI 1502 is displayed, and a response to UWB activation may be received from the second device 202.

In an embodiment, when the connection with the second device 202 fails, a third UI 1503 that cancels a finding function 1532 or induces a retry 1531 may be displayed in a pop-up form. When the connection with the second device 202 is successful, a fourth UI 1504 for scanning the detailed location of the second device 202 using the UWB signal may be provided.

In an embodiment, a fourth UI 1504 may be a screen for guiding a panoramic scan in order to more accurately receive a UWB signal. In general, a UWB antenna may include two antennas arranged in a first direction to recognize a first AOA and a second AOA, and two antennas arranged in a second direction substantially perpendicular to the first direction. Each of the antennas may be spaced apart from each other with an interval of about ½ of a wavelength of a signal used for UWB communication. Any one antenna may be commonly used for the first direction and the second direction, and in this case, a UWB antenna module may include three antennas. Since an AOA value measured through the UWB antenna may vary depending on how the user holds the first device 201, that is, the pose of the first device 201, it may be effective to acquire the UWB signal for a certain time while slowly moving the first device 201 at various angles for accurate measurement. Accordingly, the first device 201 may display an arrow at the center of the UI as shown in the fourth UI 1504 to guide the corresponding device to move in the direction of the arrow. The first device 201 may move the arrow or change the color of the arrow according to the movement range or angle. For example, in a case in which the fourth UI 1504 includes four arrows, when the first device moves by 90 degrees, the color of one of these arrows may be changed, and when the first device moves by 360 degrees, all four arrow colors may be changed. As another example, the fourth UI 1504 may provide guidance to switch the first device 201 from a portrait direction to a landscape direction.

In an embodiment, guidance for effectively receiving a UWB signal as shown in the fourth UI 1504 may be provided at an appropriate time according to the pose of the first device 201. For example, when the user holds the camera 1131 of the first device 201 to face the ground, an image obtained through the camera 1131 may not be suitable for generating AR. In addition, as the UWB antennas included in the first device 201 are disposed parallel to the ground, the UWB signal may not be well received from the second device 202. Accordingly, the first device 201 may guide the user to hold the first device 201 in a direction substantially perpendicular to the ground based on sensing data received through the one or more sensors 1130.

In an embodiment, when the movement according to the guidance is completed, the first device 201 may display a fifth UI 1505. However, the fifth UI 1505 may be omitted depending on the UWB signal state. For example, the fifth UI 1505 may represent an operation in which the first device 201 moves and calculates the location of the second device 202 based on the received UWB signal.

In an embodiment, the first device 201 may display a sixth UI 1506 when the location confirmation of the second device 202 fails. The sixth UI 1506 may include a menu for canceling 1562 the finding function or retrying 1561 the finding function.

In an embodiment, when the location of the second device 202 is confirmed based on the UWB signal, the first device 201 may display a seventh UI 1507. The seventh UI 1507 may correspond to the third screen 1430 described above with reference to FIG. 14, and a redundant description may not be repeated here. In an embodiment, the seventh UI 1507 may further include an icon 1571 for ending the guidance using the AR interface and switching the UI to a direction view that provides guidance using a map and/or azimuth. In response to a user input of selecting the icon 1571, the first device 201 may provide a map or azimuth (e.g., compass) UI guiding a direction in which the second device 202 is located.

In an embodiment, when a signal is lost from the second device 202 while moving according to the guidance of the seventh UI 1507, an eighth UI 1508 may be displayed. The eighth UI 1508 may include a menu for canceling 1582 the finding function or retrying 1581 the finding function.

In an embodiment, when it is determined that the first device 201 is in close proximity to the second device 202 and the second device 202 is located within a frame captured by the camera 1131 of the first device 201, the first device 201 may output a ninth UI 1509 to the display 1140. The ninth UI 1509 may correspond to the fourth screen 1440 of FIG. 14, and a redundant description may not be repeated here. In an embodiment, together with displaying the ninth UI 1509, the first device 201 may call the second device 202 (e.g., a ring call) or provide interaction such as a haptic generation request and/or a light emission request, thereby providing the user with the exact location of the second device 202.

Figure 16:
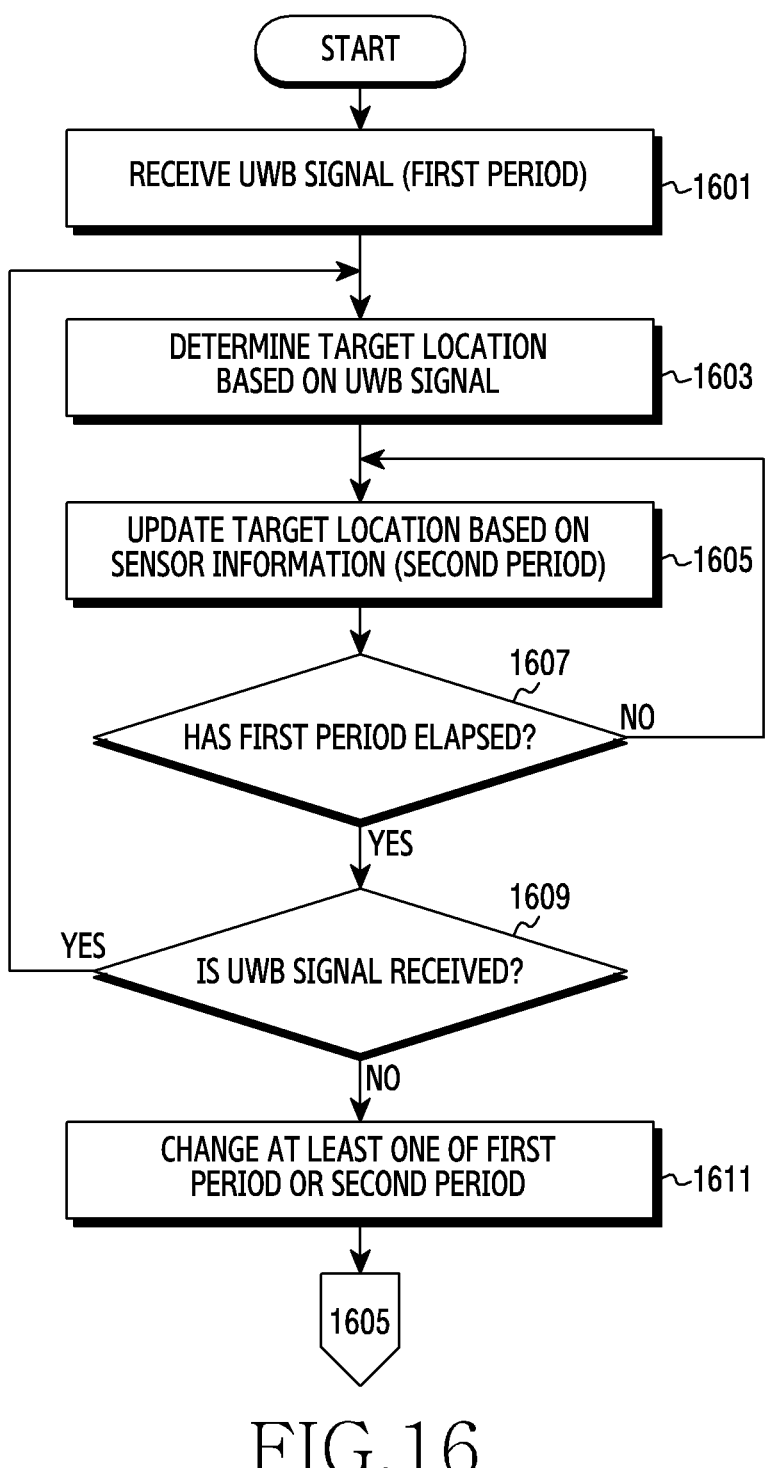
FIG. 16 is a flowchart illustrating an example operation of updating a target location using UWB and sensor data in an electronic device according to various embodiments.

FIG. 16 is a flowchart illustrating an example operation of updating a target location using UWB and sensor data in an electronic device according to various embodiments.

Referring to FIG. 16, in operation 1601, the first device 201 may receive a UWB signal from the second device 202. In an embodiment, when the first device 201 transmits a UWB activation request to the second device 202, an interval for transmitting the UWB signal may be configured as a first period, and when the first cycle arrives, the UWB signal may be received from the second device 202.

According to an embodiment, in operation 1603, the first device 201 may determine the location of a target based on the received UWB signal. Here, the target may be an anchor corresponding to the second device 202 generated by the anchor generation module 1232. That is, the anchor may be updated whenever the UWB signal is received. In other words, the anchor may be updated at the first period.

According to an embodiment, in operation 1605, the first device 201 may update the location of the target relative to the first device 201 using one or more sensors 1130. For example, when the first device 201 moves before the location of the anchor is updated since the location of the anchor is determined in operation 1603, the first device 201 may update the relative location of the anchor and the first device 201 using the information obtained through the one or more sensors 1130. Operation 1605 may be performed every second period shorter than the first period. For example, the first period may be configured to 100 ms, and the second period may be configured to 10 ms.

According to an embodiment, in operation 1607, the first device 201 may determine whether the first period has elapsed. When the first period has not yet elapsed, the first device 201 may update the location of the target every second period based on the information obtained through the one or more sensors 1130. The location of the target updated by the flowchart of FIG. 16 may be reflected in the AR interface described with reference to FIGS. 13, 14, and 15.

In an embodiment, when the first period has elapsed, in operation 1609, the first device 201 may determine whether the UWB signal is received from the second device 202. When the UWB signal is normally received, the first device 201 may update the anchor based on the newly received UWB signal by performing operation 1603 again.

In an embodiment, a new UWB signal may not be received even though the first period has arrived. For example, when the first device 201 moves toward the second device 202 and passes through a space through which a frequency band corresponding to the UWB signal is difficult to pass, a UWB communication failure may occur. In this case, the first device may change at least one of the first period and the second period in operation 1611. For example, the first device 201 may change the first period (e.g., 100 ms) to a third period (e.g., 20 ms or 50 ms) shorter than the first period to receive a new UWB signal more quickly. In this process, the first device 201 may release the UWB connection through the previously established near field communication connection (e.g., a Bluetooth channel) and may transmit a request for performing the UWB connection again with the second device at the changed period. In addition, since the first device 201 updates the relative locations of the first device 201 and the target based on the anchor configured based on the last received UWB signal, the location of the anchor has low reliability as time passes. That is, since the anchor location is less reliable than when the UWB signal is received, the first device 201 may use the one or more sensors 1130 to change the period updating the relative location to a fourth period (e.g., 20 ms or 30 ms) longer than the second period (e.g., 10 ms).

According to an embodiment, when the UWB signal is received more than a designated number of times after at least one of the first period and the second period is changed, the first device 201 may change the UWB signal reception period from the third period to the first period, and/or may change the period for updating the relative location from the fourth period to the second period using the one or more sensors 1130.

Figure 17:
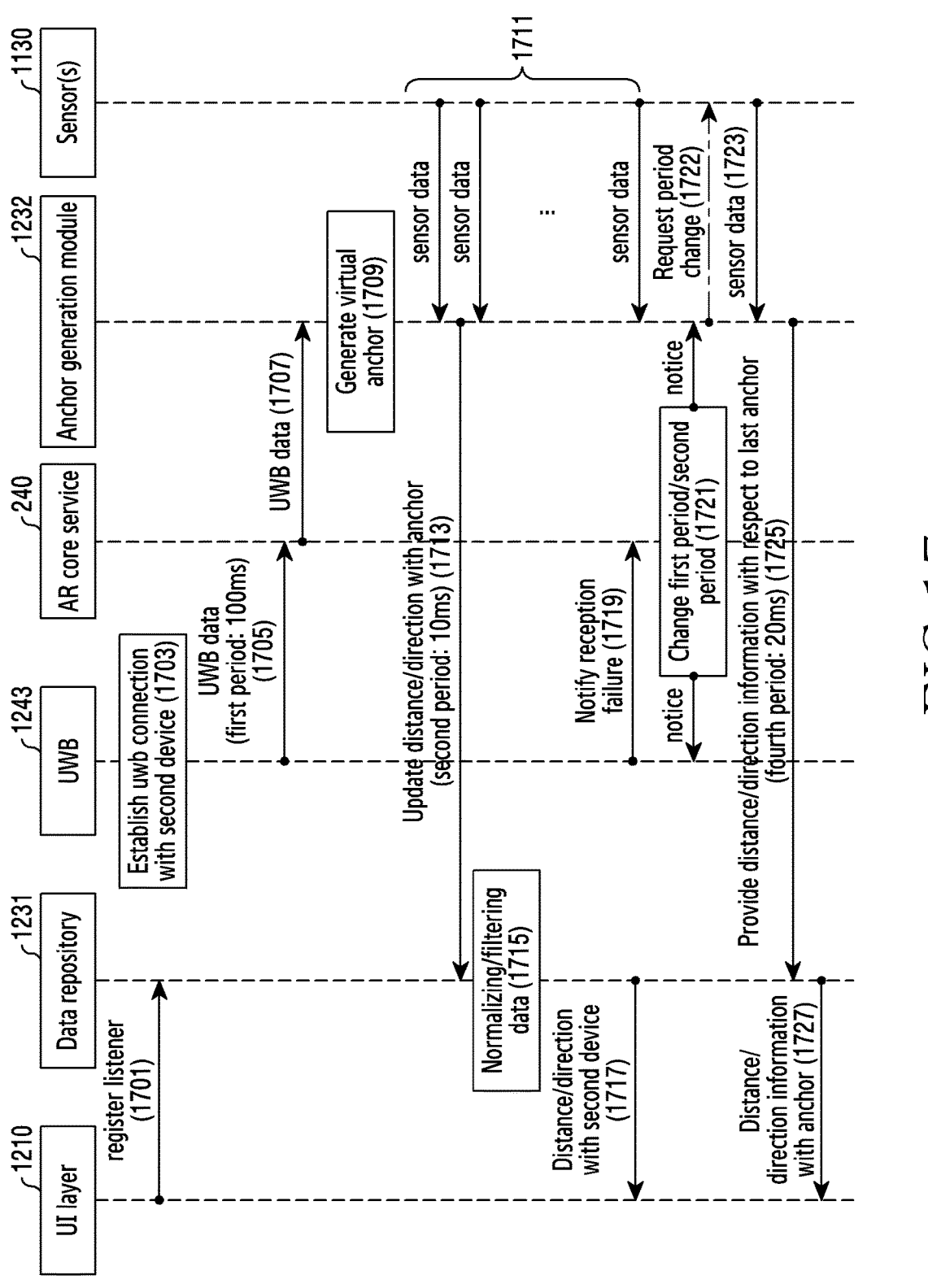
FIG. 17 is a signal flow diagram illustrating example operations of the flowchart of FIG. 16 according to various embodiments.

FIG. 17 is a signal flow diagram illustrating example operations of the flowchart of FIG. 16 according to various embodiments.

According to an embodiment, the first device 201 may include the AR core service 240, the at least one or more sensors 1130, the UI layer 1210, the data repository 1231, the anchor generation module 1232, and/or the UWB circuit 1243. Referring to FIG. 16, an operation of registering a listener through the UI layer 1210 may be performed in operation 1701. According to an embodiment, the operation of registering the listener may be understood as a process of registering various parameters related to a UWB signal received from the second device 202 in the data repository 1231. For example, information about the start of UWB communication and a transmission period (e.g., the first period—100 ms) of the second device 202 and the UWB signal may be registered in the data repository 1231. In addition, the operation of registering the listener may include registering a period (e.g., a second period—10 ms) for receiving sensor signals to assist the UWB signal and updating the UI based on the sensor signals.

According to an embodiment, in operation 1703, the UWB circuit 1243 may establish a UWB connection with the second device 202. Parameters registered in the data repository 1231 may be used for the UWB connection. In addition, the UWB circuit 1243 may be understood as the UWB finder 232.

According to an embodiment, in operation 1705, the UWB circuit 1243 may receive a UWB signal at a first period. The received UWB data may be provided to the AR core service 240.

According to an embodiment, in operation 1707, the AR core service 240 may provide UWB data to the anchor generation module 1232. The AR core service 240 may provide information about local coordinates used to generate AR in addition to the UWB data (e.g., UWB range data) obtained from the UWB circuit 1243, information about world coordinates, and/or local and information about the relationship between world coordinates, to the anchor generation module 1232.

According to an embodiment, in operation 1709, the anchor generation module 1232 may generate a virtual anchor based on the data obtained from the AR core service 240. For example, when the pose of the first device 201 is generated and the anchor is configured in the standard coordinate space, the anchor may be located in a first direction and a first distance with respect to the camera 1131 of the first device 201. When the camera 1131 is located toward the anchor in the standard coordinate space even if the location and pose of the first device 201 are changed, the anchor may be displayed within an angle of view of the camera 1131. Accordingly, when the motion and/or tilt of the first device 201 is detected using the one or more sensors 1130, the first device 201 may determine a direction in which the camera 1131 currently faces and the angle and distance between the current direction of the camera 1131.

According to an embodiment, in operation 1711, the one or more sensors 1130 may provide sensor data to the anchor generation module 1232. For example, at least one piece of data among data obtained through the camera 1131, motion information of the first device 201 obtained through the acceleration sensor 1132, tilt information of the first device 201 obtained through the gyro sensor 1133, and/or direction information of the first device 201 obtained through the geomagnetic sensor 1134 may be provided to the anchor generation module 1232. The one or more sensors 1130 may continuously or periodically provide sensor data to the anchor generation module 1132.

According to an embodiment, in operation 1713, the anchor generation module 1132 may update the AR interface at the second period by reflecting the sensor data of the first device 201 in generated virtual anchor coordinates. For example, the anchor generation module may update the distance and direction information between the first device 201 and the anchor every second period (e.g., 10 ms) and may provide the updated information to the data repository 1231.

According to an embodiment, in operation 1715, the data repository 1231 may perform normalization, flattening, and/or filtering of data using various algorithms. For example, the data repository 1231 may use a Kalman filter to remove data out of a predetermined range. The data repository 1231 may perform the above-described operation on all data provided to the data repository 1231, and a description thereof may not be repeated here.

According to an embodiment, in operation 1717, the data repository 1231 may provide information about the distance and/or direction from the anchor to the UI layer 1210. The user of the first device 201 may receive the location of the second device 202 through the AR interface updated at a designated interval (e.g., 10 ms) through the display 1140 of the first device 201. According to an embodiment, the designated interval may be determined based on a scanning rate of the display providing the AR interface.

In an embodiment, when new UWB data is to be received, the UWB signal may not be normally received. For example, when a new UWB signal is not received from the second device 202 even though the first period has elapsed since the time the UWB signal was last received, in operation 1719, the UWB circuit 1243 may notify the AR core service 240 that the UWB signal has not been received. In an embodiment, the UWB circuit 1243 may not provide any data to the AR core service 240 when the UWB signal is not received, and the AR core service 240 may determine that a communication failure has occurred in the UWB communication when the new UWB is not provided even though the first period has arrived.

According to an embodiment, in operation 1721, the AR core service 240 may change one or more of the first period that is the reception period of the UWB signal and the second period that is the update period of the target location using the data of the one or more sensors 1130. For example, the AR core service 240 may request to change the first period to a third period shorter than the first period from the UWB circuit 1243. According to an embodiment, the UWB circuit 1243 may release the existing UWB connection configured in the first period based on the period change request received from the AR core service 240, and may configure a new UWB connection requesting to transmit the UWB signal at the third period. Messages related to the release/re-establishment of the UWB connection may be exchanged through the near field communication connection established by the first communication circuit 1121. As another example, the AR core service 240 may request to change the second period to a fourth period longer than the second period from the anchor generation module 1232.

In operation 1722, the anchor generation module 1232 may request the period change received from the AR core service 240, from the one or more sensors 1130. However, in an embodiment, while the period of sensor data acquired from the one or more sensors 1130 may be maintained, only the period updated by the anchor generation module 1232 may be increased. When only the period updated by the anchor generation module 1232 is increased, the process for the request transmitted by the anchor generation module 1232 to the one or more sensors 1130 may be omitted.

According to an embodiment, in operation 1723, the anchor generation module 1232 may acquire sensor data even after the UWB signal is not received. In this case, the anchor generation module 1232 may maintain the coordinates of the anchor generated based on the last received UWB signal. That is, the newly acquired sensor data may be reflected based on the last generated anchor.

According to an embodiment, in operation 1725, the anchor generation module 1232 may provide distance and direction information based on the last anchor to the data repository 1231. For example, the anchor generation module 1232 may provide the location of the anchor relative to the first device 201 to the data repository 1231 at a fourth period longer than the second period.

According to an embodiment, in operation 1727, the data repository 1231 may provide information on the distance and/or direction to the anchor based on the changed period, to the UI layer 1210. The UI layer 1210 may update the AR interface based on the distance and direction information from the anchor received from the data repository 1231.

Figure 18:
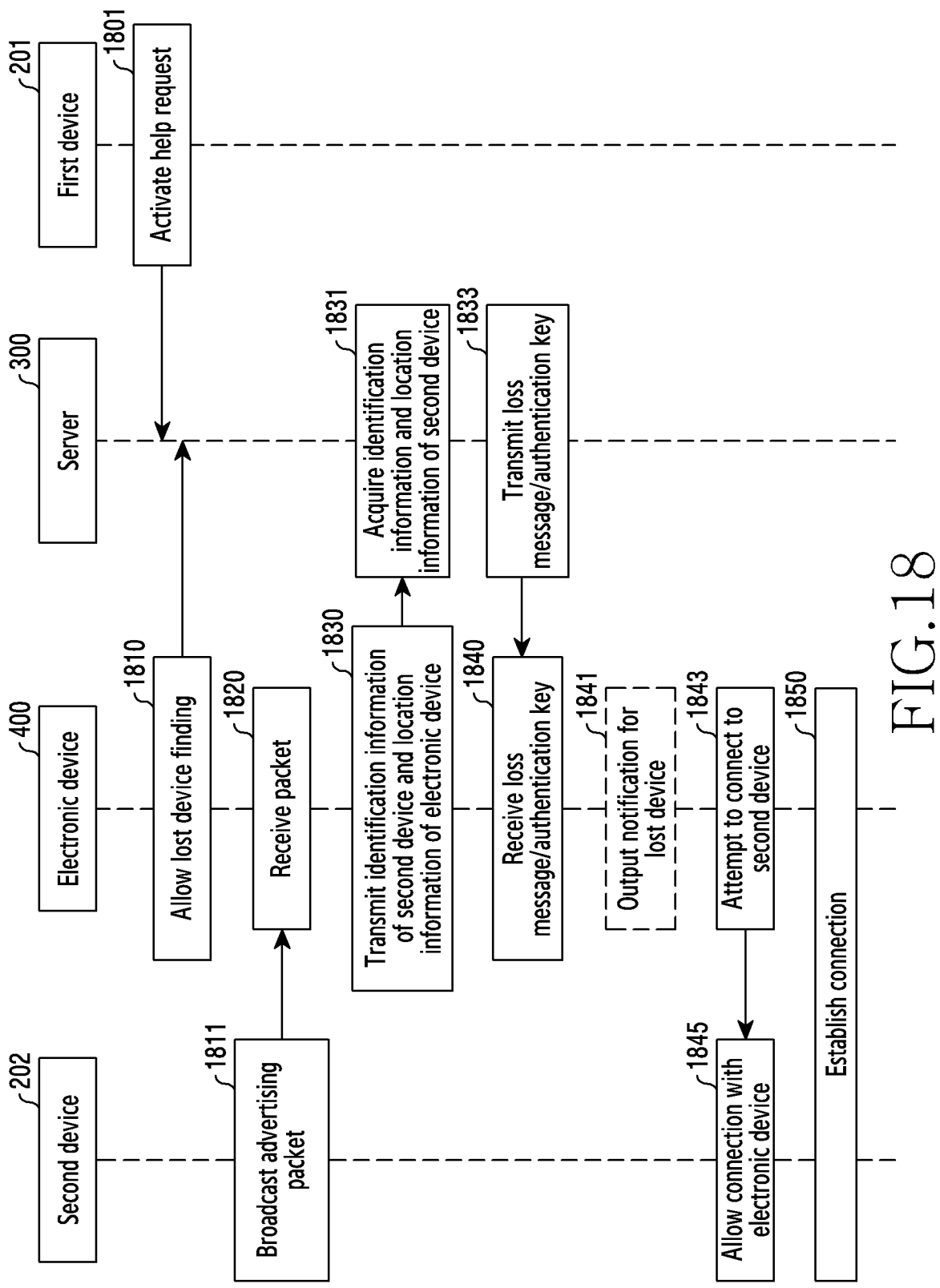
FIG. 18 is a signal flow diagram illustrating an example of establishing a connection with a lost device according to various embodiments.

FIG. 18 is a signal flow diagram illustrating an example operation of establishing a connection with a lost device according to various embodiments.

Referring to FIG. 18, an example in which, when the user of the first device 201 who has lost the second device 202 applies a configuration related to the loss of the second device 202, the electronic device 400 of another user finds the second device 202 and communicates with the second device 202 is described. Among the contents described with reference to FIGS. 1 to 17, contents not arranged with those of FIGS. 18 to 21 may be equally applied to the description of FIGS. 18 to 21.

According to an embodiment, in operation 1801, the first device 201 may activate a help request. For example, the user of the first device 201 recognizing that the second device 202 has been lost may register information helpful in finding the second device 202. Additionally or alternatively, the user of the first device 201 may actively request assistance from other users for finding the second device 202. An example UI related to registration of information and requesting help is described with reference to FIG. 19.

In an embodiment, when a help request is activated through the UI of the first device 201, the first device 201 may transmit information indicating that the help request is activated to the server 300. The server 300 may receive information indicating that the help request for the lost device, e.g., the second device 202, has been activated, from the first device 201. In addition, the information may include information about a loss message. The loss message may include, for example, a contact to be contacted when the lost device is found (e.g., a contact of the user of the first device 201), information about reward at the time of loss, and the like.

In an embodiment, the help request may be made before the loss of the second device 202 or may be made after the loss. When the help request is made before the loss of the second device 202, the first device 201 may provide the second device 202 with the loss message using the first wireless communication circuit 1121 supporting near field range communication (e.g., BT). The second device 202 may store the acquired loss message in the memory 1020 and may provide the loss message to the electronic device 400 after a connection with the electronic device 400 is established.

In an embodiment, when the help request is made after the second device 202 is lost, the loss message may be provided to the electronic device 400 by the server 300.

According to an embodiment, in operation 1810, the electronic device 400 may allow to find the lost device. Operation 1810 may correspond to operation 811 of FIG. 8.

For example, the electronic device 400 may activate a function of searching for the lost device through an appropriate setting screen. An example UI related thereto will be described with reference to FIG. 20.

In an embodiment, the lost device finding function of the electronic device 400 may be basically in an activated state. In this case, the user of the electronic device 400 may deactivate the lost device finding function in order to reduce power consumption. In an embodiment, the lost device finding function of the electronic device 400 may be automatically activated when the battery of the electronic device 400 is above a designated level (50%). In an embodiment, the lost device finding function of the electronic device 400 may be basically in an inactive state. The lost device finding function may be activated through a user input to the appropriate setting screen.

According to an embodiment, the second device 202 in the lost state in operation 1811 may broadcast an advertising packet. Operation 1811 may correspond to operation 601 of FIG. 6, operation 801 of FIG. 8, and operation 901 of FIG. 9.

According to an embodiment, in operation 1820, the electronic device 400 may receive the advertising packet broadcasted by the second device 201. Operation 1820 may correspond to operation 611 of FIG. 6.

According to an embodiment, in operation 1830, the electronic device 400 may transmit identification information of the second device 202 and location information of the electronic device 400 to the server 300. For example, the electronic device 400 may confirm the identification information (e.g., the privacy ID 1004) of the second device 202 included in the advertising packet of the second device 202. In addition, the electronic device 400 may confirm the location information of the electronic device 400 using the location measuring circuit. The electronic device 400 may transmit the confirmed identification information and location information to the server 300. Operation 1830 may correspond to operations 613 and 615 of FIG. 6.

According to an embodiment, in operation 1831, the server 300 may obtain (acquire) the identification information and location information of the second device 202. Operation 1831 may correspond to operation 621 of FIG. 6.

According to an embodiment, in operation 1833, the server 300 may transmit the loss message and/or an authentication key to the electronic device 400. For example, the server 300 may confirm the configuration of the first device 201 corresponding to the identification information of the second device 202 received from the electronic device 400. For example, the server 300 may confirm that the help request for the lost device is activated in the first device 201. When the help request is activated, the server 300 may transmit the loss message and an authentication key such as a onetime session key to the electronic device 400. The authentication key may be used to authenticate that the electronic device 400 and the second device 202 are trusted devices without separate encryption/decryption during wireless communication connection (e.g., BLE GATT connection).

In an embodiment, when the help request is not activated, the server 300 may perform operation 623 of FIG. 6 instead of performing operations 1833 to 1850 of FIG. 18.

In an embodiment, the privacy ID 1004 of the second device 202 may be changed at regular intervals for security purposes. For example, the second device 202 may change the privacy ID 1004 included in the advertising packet at a 15-minute interval according to a predetermined algorithm. The algorithm may be implemented in the same manner in the first device 201 and/or the server 300. For example, the server 300 may generate a one-time session key corresponding to the first private key in a first-time interval (e.g., 15 minutes) in which the identification information of the second device 202 is maintained with the first private key. Here, this one-time session key may be valid for communication with the second device 202 only during the first-time interval. For example, after a predetermined time elapses after the electronic device 400 receives the one-time session key (e.g., after the privacy ID 1004 of the second device 202 is changed to the second private key), when the communication connection with the second device 202 is attempted with the one-time session key corresponding to the first privacy key, the communication connection may be rejected by the second device 202.

According to an embodiment, in operation 1840, the electronic device 400 may receive the loss message and/or the authentication key from the server 300. In operation 1841, the electronic device 400 may output a notification regarding the lost device on the display of the electronic device 400. For example, the electronic device 400 may display a notification that there is the lost device nearby on the display using a pop-up, a notification, sound, vibration, or the like.

According to an embodiment, in operation 1843, the electronic device 400 may attempt to connect with the second device 202 using the authentication key. The electronic device 400 may include a first wireless communication circuit supporting a near field communication network and a second wireless communication circuit supporting a long-distance communication network (e.g., cellular, Wi-Fi). The electronic device 400 may use the second wireless communication circuit in communication with the server 300 and may use the first wireless communication circuit in communication with the second device 202.

According to an embodiment, in operation 1845, the second device 202 may allow a connection with the electronic device 400 based on the authentication key received from the electronic device 400. For example, the second device 202 may allow a BLE generic attribute (GATT) connection with the electronic device based on the authentication key. However, the connection between the second device 202 and the electronic device 400 may be various connections using the near field communication and is not limited to a GATT connection.

According to an embodiment, in operation 1850, the electronic device 400 may establish a communication connection with the second device 202. The electronic device 400 may control some functions of the second device 202, or may obtain the loss message from the second device 202 using this communication connection.

Hereinafter, various example UIs of the first device 201 and the electronic device 400 performing the operations of FIG. 18 will be described below with reference to FIGS. 19, 20 and 21.

Figure 19:
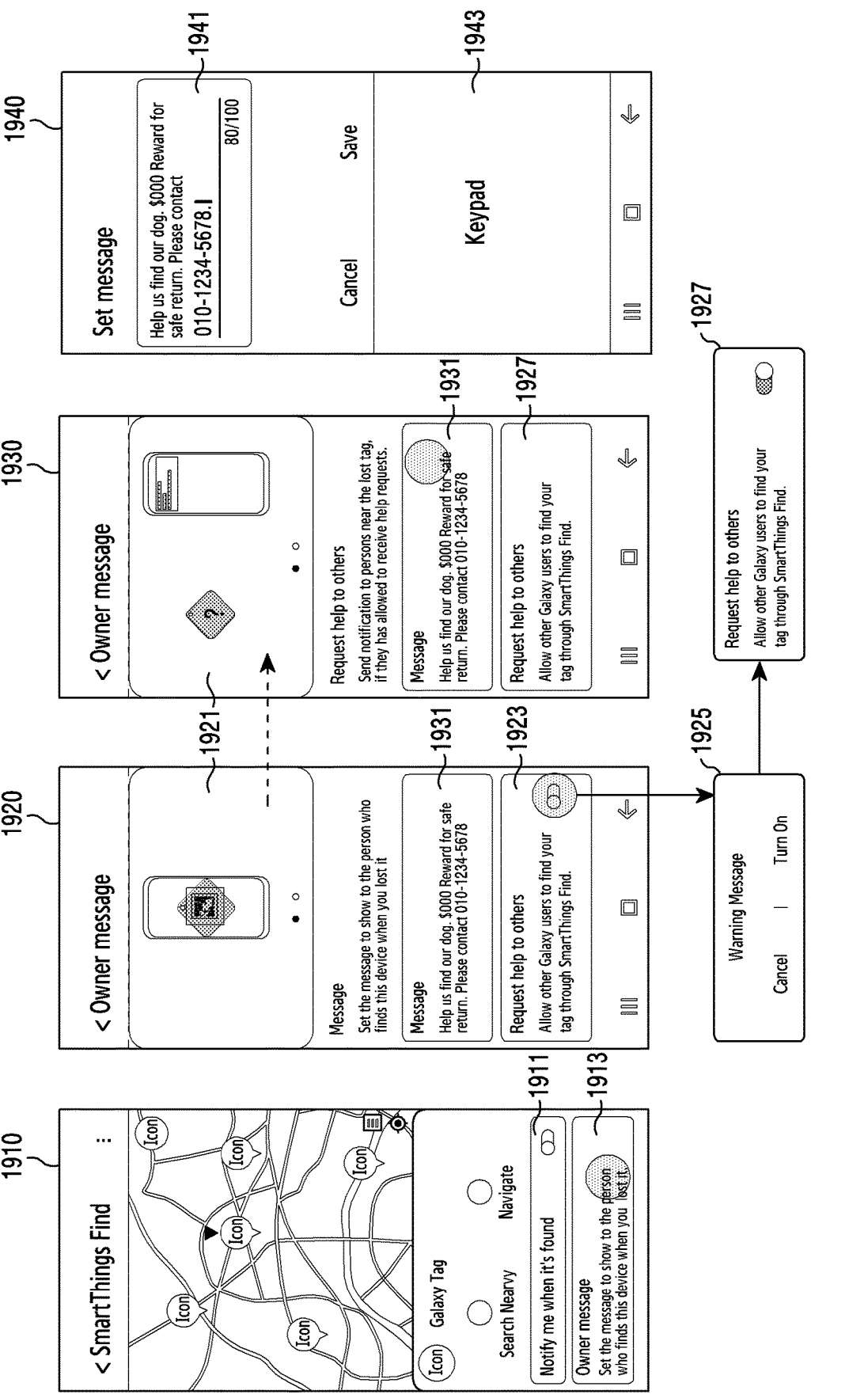
FIG. 19 is a diagram illustrating example UIs for activating a help request for finding a lost device and registering a lost message in a first device according to various embodiments.

FIG. 19 is a diagram illustrating various example UIs for activating a help request for finding a lost device and registering a lost message in a first device according to various embodiments.

Referring to FIG. 19, an interface such as a first screen 1910 may be provided on the display of the first device 201 in order to make a configuration related to a help request. The second device 202 may be registered in advance in the first device 201 with a name such as, for example, "Galaxy Tag".

In an embodiment, the first screen 1910 may include a first configuration item 1911 to provide a notification when a lost device is found, and a second configuration item 1913 for the owner to register a message/configuration. In response to the selection of the second configuration item 1913, the electronic device 400 may display a second screen 1920.

In an embodiment, the second screen 1920 may include a region 1921 indicating that a configuration screen can be switched through a touch input such as flicking, dragging, or scrolling. When the second screen 1920 is switched to a third screen 1930, an indicator in the region 1921 may indicate the current page.

In an embodiment, in response to a selection of a "request help to others" item 1923, the first device 201 may switch a help request function, which is in the inactive state, to an active state. When the help request function is in the activated state, the help request function may be switched to the inactive state in response to the selection.

In an embodiment, when the help request function is switched from the inactive state to the active state, an appropriate warning message 1925 may be provided. The warning message 1925 may be provided in a pop-up form overlaid on the second screen 1920, or may be provided in a form replacing the item 1923. When the help request function is activated, warning about the fact that information regarding the user's contact information may be provided, the fact that some functions (e.g., a ring) of the second device 202 may be controlled by another device, and/or the fact that the promise of compensation may be legally binding may be output. When the warning message 1925 is acknowledged (e.g., selection of turn on), a toggle switch of the item 1923 may be activated.

In other embodiments, the warning message 1925 may be omitted. In this case, in response to selecting the item 1923, the finding lost device function may be activated immediately. For example, on the second screen 1920, the item 1923 may be replaced with the item 1927.

In an embodiment, the first device 201 may display a fourth screen 1940 for inputting the loss message in response to the selection of the loss message item 1931. For example, the user may generate and store the loss message 1941 using a keypad area 1943 or suitable input means.

Figure 20:
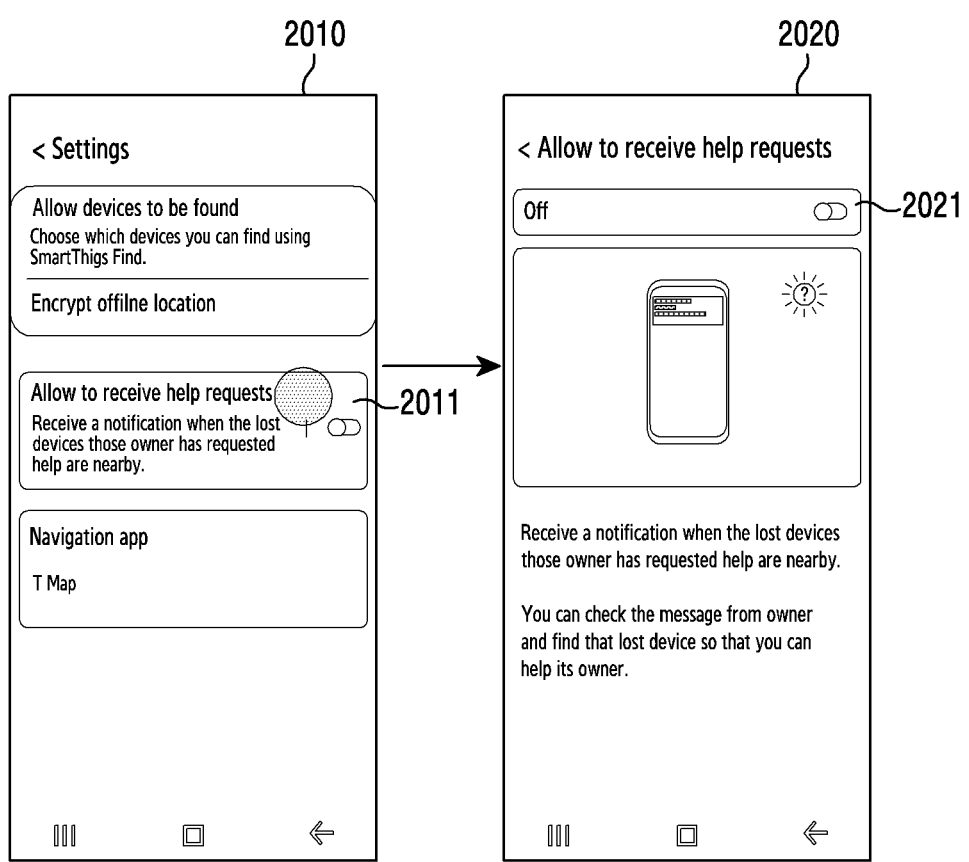
FIG. 20 is a diagram illustrating example UIs for activating a lost device finding function in an electronic device according to various embodiments.

FIG. 20 is a diagram illustrating various example UIs for activating a lost device finding function in an electronic device according to various embodiments.

In an embodiment, the first screen 2010 may include an item 2011 for activating a lost device finding function. In response to the selection of the item 2011 for activating the lost device finding function, the electronic device 400 may display a second screen 2020. When the lost device finding function is activated, the electronic device 400 may activate the first wireless communication circuit for near field communication of FIG. 18 and may scan the advertising packet broadcasted by the peripheral device.

In an embodiment, the second screen 2020 may include a description indicating that the lost device finding function is activated. The user may switch the lost device finding function to an inactive state by selecting an OFF button 2021 of the second screen.

Figure 21:
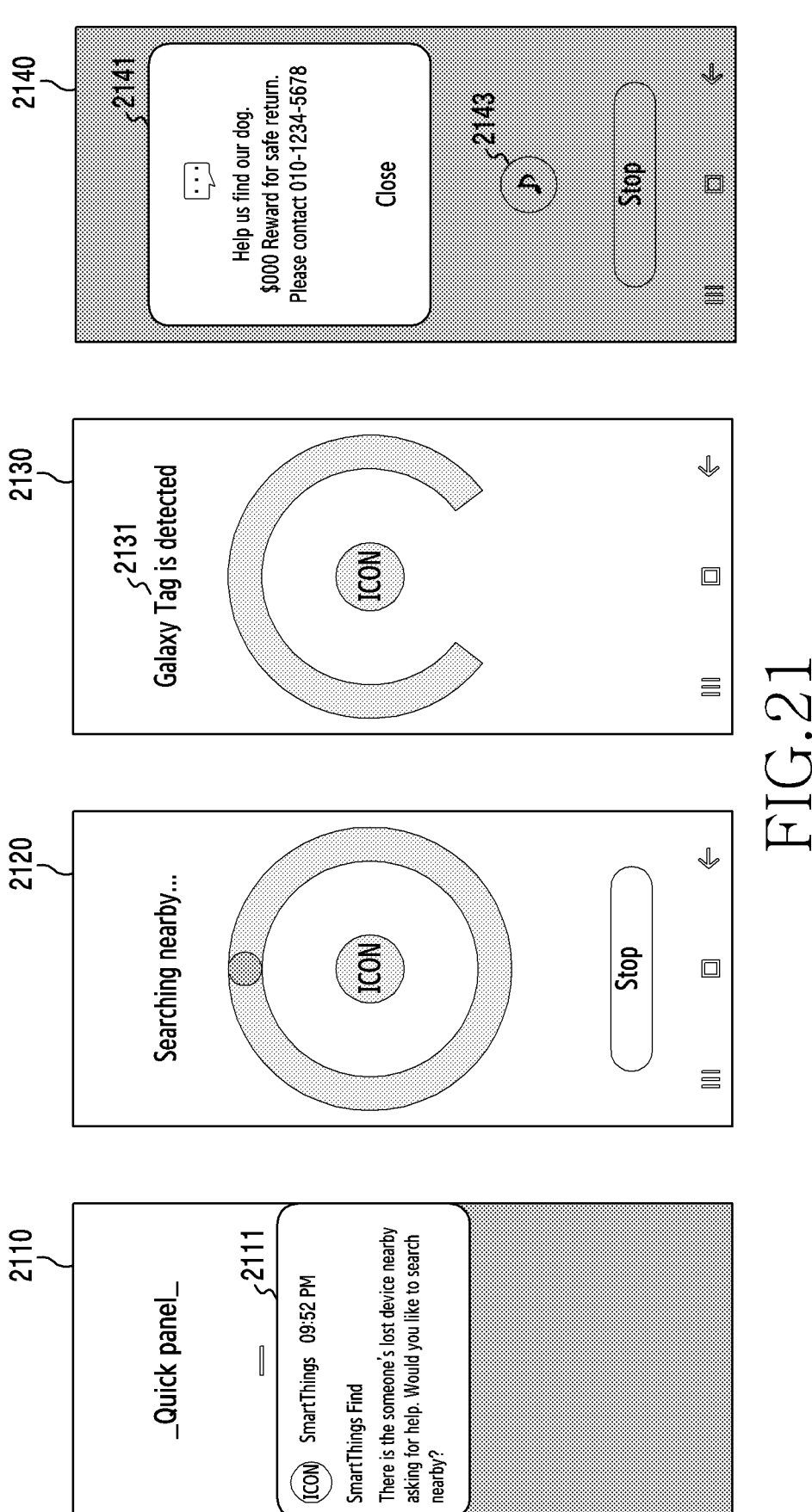
FIG. 21 is a diagram illustrating example UIs for performing a connection with a lost device in an electronic device according to various embodiments.

FIG. 21 is a diagram illustrating various example UIs for performing a connection with a lost device in an electronic device according to various embodiments.

As described with reference to FIGS. 18 and 20, the electronic device 400 may activate the lost device finding function. When the lost device finding function is activated, the electronic device 400 may recognize that there is a lost device nearby by receiving an advertising packet from a lost device such as the second device 202 existing nearby.

In an embodiment, when a help request is activated for the second device 202, the electronic device 404 may receive information including a loss message/authentication key from the server 300. In response to the reception of the information, the electronic device 400 may output a notification about the lost device on the display. For example, the electronic device 400 may perform operation 1841 of FIG. 18.

In an embodiment, the electronic device 400 may output a first UI 2110 to the display when operation 1841 is performed. For example, the electronic device 400 may display the first UI 2110 including a message 2111 confirming whether there is the lost device nearby and whether to perform a search. The message of FIG. 21 is merely an example and may be changed as appropriate. For example, a message confirming whether to perform a connection with the second device 202 may be output. In addition, the message may be output as a pop-up, sound, vibration, notification, or a combination of two or more thereof.

In an embodiment, in response to a user input for the message, the electronic device 400 may attempt to connect with the second device 202. For example, the electronic device 400 may attempt a BLE GATT connection with the second device 202 using an authentication key (e.g., a one-time session key) received from the server 300. While the electronic device 400 is attempting to connect, a second UI 2120 indicating that the connection is being attempted may be displayed.

In an embodiment, when the connection with the second device 202 using the authentication key is established, the electronic device 400 may display a third UI 2130 indicating that the connection with the second device 202 has been established. The third UI 2130 may include identification information (e.g., a Galaxy Tag) of a connected device.

In an embodiment, a fourth UI 2140 may be displayed in response to a user input for the third UI 2130. In another example, the fourth UI 2140 may be automatically displayed after a designated time elapses after the third UI 2130 is displayed. In an embodiment, the display of the third UI 2130 may be omitted and the fourth UI 2140 may be displayed immediately.

In an embodiment, the fourth UI 2140 may include a loss message 2141 registered by the first device 201. In addition, the fourth UI 2140 may include an icon 2143 for ringing a ring of the second device 202. For example, in response to selection of the icon 2143, the electronic device 400 may transmit a control signal for ringing a ring to the second device 202 through a BLE GATT connection. The second device 202 may output a ring sound by controlling a speaker of the second device 202 in response to receiving the control signal. Through the above-described control, the electronic device 400 can effectively find the second device 202.

In the above example, it has been described that the electronic device 400 controls the ring sound of the second device 202 through the icon 2143, but the electronic device 400 may control one or more functions of the electronic device 202 through an appropriate icon, menu, button, etc. For example, the electronic device 400 may generate a vibration in the second device 202 or, may control the second device 202 to transmit a UWB signal. The electronic device 400 may effectively identify the location of the second device 202 using the UWB signal received from the second device 202. In this regard, the electronic device 400 may perform at least some of the functions described as being capable of being performed by the first device 201 using FIGS. 13 to 17.

An electronic device (e.g., the electronic device 101 or the first device 201) according to an example embodiment may include: a camera (e.g., the camera module 180 or the camera 1131); a display (e.g., the display module 160 or the display 1140); a location measuring circuit; an ultra-wide band (UWB) antenna; a UWB communication circuit connected with the UWB antenna; a first wireless communication circuit configured to support near field communication; a second wireless communication circuit configured to support cellular communication; and at least one processor (e.g., the processor 120 or the processor 1110). The at least one processor may be configured to: acquire information about an external device (e.g., the second device 202) registered in the electronic device and not currently connected to the electronic device, from a server (e.g., the server 300) using the second wireless communication circuit; determine whether the electronic device is within a specified distance from coordinates of the external device included in the information about the external device based on information obtained from the server and a location of the electronic device measured by the location measuring circuit; establish a near field communication connection with the external device through the first wireless communication circuit in response to the determination; transmit a request for activating a UWB function of the external device to the external device through the established near field communication connection; identify the location of the external device with respect to the electronic device based on a UWB signal received from the external device; and output an augmented reality (AR) interface to the display based on image data acquired using the camera and the identified location of the external device.

In an example embodiment, the AR interface may include a first object indicating a distance from a current location of the electronic device to the identified location of the external device. In addition, the AR interface may include a second object pointing to the identified location of the external device.

In an example embodiment, based on the electronic device not being within the specified distance from the coordinates of the external device, the at least one processor may be configured to provide guidance for moving the display toward the coordinates of the external device.

In an example embodiment, based on a response indicating that the activation of the UWB function is impossible being received from the external device in response to the request for activating the UWB function, the at least one processor may be configured to detect a distance to the external device using the first wireless communication circuit.

In an example embodiment, the at least one processor may be configured to determine whether to use the UWB function based on the information about the external device obtained from the server.

In an example embodiment, the information obtained from the server may include information on whether the external device supports UWB communication or information on a battery of the external device.

In an example embodiment, based on the electronic device not being within the specified distance from the coordinates of the external device, the at least one processor may be configured to output a first UI to the display, and switch the first UI to a second UI including the image data obtained using the camera in response to the electronic device being within the specified distance from the coordinates of the external device and the near field communication connection being established between the electronic device and the external device.

In an example embodiment, the electronic device may further include one or more sensors (e.g., the one or more sensors 1130), and the at least one processor may be configured to: receive the UWB signal from the external device every first period using the UWB communication circuit; and update the location of the external device, identified based on the UWB signal, every second period, the second period being shorter than the first period, based on sensor data obtained through the one or more sensors.

In an example embodiment, based on the first period arriving and the UWB signal not being received from the external device, the at least one processor may be configured to change at least one of the first period and the second period.

A method according to an example embodiment may include: acquiring information about an external device (e.g., the second device 202) registered in an electronic device (e.g., the electronic device 101 or the first device 201) and not currently connected to the electronic device, from a server (e.g., the server 300) using a second wireless communication circuit of the electronic device; determining whether the electronic device is within a specified distance from coordinates of the external device included in the information about the external device based on information obtained from the server and a location of the electronic device measured by the location measuring circuit of the electronic device; establishing a near field communication connection with the external device through the first wireless communication circuit in response to the determination; transmitting a request for activating an ultra-wide band (UWB) function of the external device to the external device through the established near field communication connection; identifying the location of the external device with respect to the electronic device based on a UWB signal received from the external device; and outputting an augmented reality (AR) interface to the display of the electronic device based on image data acquired using the camera of the electronic device and the identified location of the external device.

The method according to an example embodiment may further include: providing guidance for moving the display toward the coordinates of the external device based on the electronic device not being within the specified distance from the coordinates of the external device.

The method according to an example embodiment may further include: detecting a distance to the external device using the first wireless communication circuit based on a response indicating that the activation of the UWB function is impossible being received from the external device in response to the request for activating the UWB function.

The method according to an example embodiment may further include: outputting a first UI to the display based on the electronic device not being within the specified distance from the coordinates of the external device; and switching the first UI to a second UI including the image data obtained using the camera in response to the electronic device being within the specified distance from the coordinates of the external device and the near field communication connection is established between the electronic device and the external device.

The method according to an example embodiment may further include: receiving the UWB signal from the external device every first period using the UWB communication circuit; and updating the location of the external device, identified based on the UWB signal, every second period, the second period being shorter than the first period, based on sensor data obtained through the one or more sensors.

An electronic device (e.g., the second electronic device 202) according to an example embodiment may include: a wireless communication circuit (e.g., the communication circuit 1030); an ultra-wide band (UWB) communication circuit; a UWB antenna electrically connected to the UWB communication circuit; and a processor (e.g., the processor 1010) electrically or operatively connected to the wireless communication circuit and the UWB communication circuit. The processor may be configured to: establish a near field communication connection with an external device using the wireless communication circuit; receive a UWB activation request through the near field communication connection; and transmit a UWB signal of a designated frequency using the UWB communication circuit in response to the UWB activation request.

In an example embodiment, the processor may be configured to broadcast an advertising packet including information indicating whether the UWB communication circuit is available using the wireless communication circuit.

In an example embodiment, the processor may be configured to provide information indicating whether the UWB communication circuit is available to the external device (e.g., the first device 201) through the near field communication connection.

In an example embodiment, the processor may be configured to provide, to the external device, information indicating that the UWB communication circuit is not available based on a remaining battery level of the electronic device being equal to or less than a reference value.

In an example embodiment, the UWB activation request may include information about a period for transmitting the UWB signal using the UWB communication circuit, and the processor may be configured to transmit the UWB signal every period using the UWB communication circuit.

An electronic device according to an example embodiment may include: a location measuring circuit; a first wireless communication circuit configured to support near field communication; a second wireless communication circuit configured to support cellular communication; and at least one processor electrically connected to the location measuring circuit, the first wireless communication circuit, and the second wireless communication circuit. The at least one processor may be configured to: acquire an advertising packet from the external device using the first wireless communication circuit; transmit identification information of the external device obtained from the advertising packet and location information of the electronic device obtained through the location measuring circuit to the server using the second wireless communication circuit; acquire an authentication key associated with the external device from the server; and establish a communication connection with the external device using the authentication key.

In an example embodiment, the at least one processor may further acquire a loss message together with the authentication key from the server using the second wireless communication circuit.

In an example embodiment, the electronic device may further include a display, and the at least one processor may be configured to output the loss message to the display.

In an example embodiment, the at least one processor may be configured to transmit a control signal for controlling at least one function of the external device through the communication connection.

In an example embodiment, the at least one processor may establish a bluetooth low energy generic attribute (BLE GATT) connection with the external device using the first wireless communication circuit.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising,
a display;
a first communication module, comprising circuitry, configured to support a Bluetooth communication;
a second communication module, comprising circuitry, configured to support a UWB (ultra-wide band) communication;
memory storing instructions; and
at least one processor comprising processing circuitry,
wherein the instructions, when executed by the at least one processor individually and/or collectively, cause the electronic device to:
receive a user input to execute a function for finding a lost device registered to the electronic device;
when the user input is received and cause the electronic device to connect to the lost device through the Bluetooth communication, determine a distance between the electronic device and the lost device;
display, on the display, a first indicator for representing the distance between the electronic device and the lost device;
when the electronic device connects to the lost device through the UWB communication, identify a direction from the electronic device to the lost device,
display, on the display, a second indicator for representing a direction from the electronic device to the lost device.

2. The electronic device of claim 1, wherein the instructions, when executed by the at least one processor individually and/or collectively, cause the electronic device to:
identify the direction from the electronic device to the lost device in response to connecting to the lost device through the UWB communication while the first indicator is displayed on the display.

3. The electronic device of claim 1, wherein the instructions, when executed by the at least one processor individually and/or collectively, cause the electronic device to:
display, on the display, the second indicator together with the first indicator while the first indicator is displayed on the display.

4. The electronic device of claim 3, wherein the instructions, when executed by the at least one processor individually and/or collectively, cause the electronic device to:
determine a location of the lost device to the electronic device based on a UWB signal received from the lost device in response to connecting to the lost device through the UWB communication; and
determine the distance between the electronic device and the lost device based on the UWB signal received from the lost device in response to connecting to the lost device through the UWB communication, and
wherein the first indicator displayed with the second indicator representing the distance determined based on the UWB signal.

5. The electronic device of claim 1, wherein the second indicator includes an arrow indicating the direction from the electronic device to the lost device.

6. The electronic device of claim 1, wherein the instructions, when executed by the at least one processor individually and/or collectively, cause the electronic device to:
measure strength of a Bluetooth signal received from the lost device, when the electronic device connects to the lost device through the Bluetooth communication; and
determine the distance between the electronic device and the lost device based on the measured strength of the Bluetooth signal.

7. The electronic device of claim 1,
wherein the distance represented by the first indicator and the direction indicated by the second indicator are simultaneously changed in response to the electronic device being moved, and
wherein the first indicator and the second indicator are displayed on the display through a AR (augment reality) interface.

8. The electronic device of claim 1,
wherein the electronic device is connected to the lost device through the Bluetooth communication when the electronic device is located within a first distance range from the lost device, and
wherein the electronic device is connected to the lost device through at least the UWB communication when the electronic device is located within a second distance range smaller than the first distance range.

9. The electronic device of claim 8, wherein the instructions, when executed by the at least one processor individually and/or collectively, cause the electronic device to:
display a user interface for registering the lost device, in response to connecting to the lost device through a short-range wireless communication before the lost device being lost; and
register the lost device to a server based on a user input to the user interface.

10. The electronic device of claim 9, wherein the instructions, when executed by the at least one processor individually and/or collectively, cause the electronic device to:
receive information related to a location of the lost device from the server, when the electronic device is located outside the first distance range and the second distance range, and wherein the information related to the location of the lost device is transmitted from the lost device to another electronic device through a short-range wireless communication and transmitted from the other electronic device to the server, and wherein a user of the other electronic device is different from a user of the electronic device.

11. A method of operating an electronic device, the method comprising:

acquiring information about an external device registered in an electronic device and not currently connected to the electronic device, from a server using a second wireless communication circuit of the electronic device, the information about the external device including information about coordinates of the external device;

determining whether the electronic device is within a specified distance from coordinates of the external device based on information obtained from the server and a location of the electronic device measured by the location measuring circuit;

establishing a near field communication connection with the external device through the first wireless communication circuit of the electronic device in response to the determination;

transmitting a request for activating an ultra-wide band (UWB) function of the external device to the external device through the established near field communication connection;

identifying the location of the external device with respect to the electronic device based on a UWB signal received from the external device; and outputting an augmented reality (AR) interface to the display of the electronic device based on image data acquired using the camera of the electronic device and the identified location of the external device.

12. The method of claim 11, further comprising:

providing guidance for moving the display toward the coordinates of the external device based on the electronic device not being within the specified distance from the coordinates of the external device.

13. The method of claim 11, further comprising:

detecting a distance to the external device using the first wireless communication circuit based on a response indicating that the activation of the UWB function is not possible being received from the external device in response to the request for activating the UWB function.

14. The method of claim 11, further comprising:

outputting a first UI to the display based on the electronic device not being within the specified distance from the coordinates of the external device; and switching the first UI to a second UI including image data obtained using the camera in response to the electronic device being within the specified distance from the coordinates of the external device and the near field communication connection is established between the electronic device and the external device.

15. The method of claim 11, further comprising:

receiving the UWB signal from the external device every first period using the UWB communication circuit; and updating the location of the external device, identified based on the UWB signal, every second period, the second period being shorter than the first period, based on sensor data obtained through the one or more sensors.

* * * * *